US012214951B2

(12) United States Patent
Dolmayan

(10) Patent No.: US 12,214,951 B2
(45) Date of Patent: *Feb. 4, 2025

(54) APPARATUS AND SYSTEM FOR AUTHENTICATING, GRADING, AND ENCAPSULATING COLLECTIBLES

(71) Applicant: SGCC Inc., Las Vegas, NV (US)

(72) Inventor: John Hovig Dolmayan, Las Vegas, NV (US)

(73) Assignee: SGCC Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/499,928

(22) Filed: Nov. 1, 2023

(65) Prior Publication Data

US 2024/0140678 A1 May 2, 2024

Related U.S. Application Data

(63) Continuation of application No. 17/368,642, filed on Jul. 6, 2021, now Pat. No. 11,834,249.

(Continued)

(51) Int. Cl.
*B65D 25/54* (2006.01)
*A43D 3/14* (2006.01)
(Continued)

(52) U.S. Cl.
CPC ........... *B65D 81/18* (2013.01); *A43D 3/1433* (2013.01); *B65B 5/06* (2013.01); *B65D 25/205* (2013.01);
(Continued)

(58) Field of Classification Search
CPC ........ A43D 3/1433; B65B 5/06; B65B 55/18; B65D 2203/02; B65D 2203/06;
(Continued)

(56) References Cited

U.S. PATENT DOCUMENTS 2,551,354 A * 5/1951 Wasilevich ............... A47G 1/12
248/128
3,063,550 A * 11/1962 Boden .................. A43D 3/1433
D3/273
(Continued)

FOREIGN PATENT DOCUMENTS

CN 207821783 U * 9/2018 ............. A47L 23/20
GB 2289040 A1 11/1995
(Continued)

*Primary Examiner* — Anthony D Stashick
*Assistant Examiner* — Marcos Javier Rodriguez Molina
(74) *Attorney, Agent, or Firm* — Perkins Coie LLP; Michael Glenn; Vikram Iyengar

(57) ABSTRACT

A case includes a first shell to encapsulate a portion of a collectible. The first shell includes a planar first end having a recessed first edge. A wall is attached to the planar first end at the first edge of the planar first end and surrounds the portion of the collectible. A shoe tree includes a foot-shaped portion for insertion into the collectible and supporting the collectible. An end portion is attached to the foot-shaped portion and rests against the wall, wherein the first shell is configured to support the shoe tree. A second shell seals the case and includes a planar second end to be placed on a lip of the wall, wherein the collectible is configured to be encapsulated by the case. The planar second end has a recessed edge to align with the recessed first edge to enable the case to be stacked on a counterpart case.

20 Claims, 17 Drawing Sheets

Related U.S. Application Data

(60) Provisional application No. 63/049,011, filed on Jul. 7, 2020.

(51) Int. Cl.

| | | |
|---|---|---|
| *B65B 5/06* | (2006.01) | |
| *B65D 25/20* | (2006.01) | |
| *B65D 81/18* | (2006.01) | |
| *B65D 81/26* | (2006.01) | |
| *B65D 85/18* | (2006.01) | |
| *G06K 7/14* | (2006.01) | |
| *G06N 20/00* | (2019.01) | |
| *G09F 3/00* | (2006.01) | |
| *B65B 55/18* | (2006.01) | |
| *B65D 25/04* | (2006.01) | |
| *B65D 25/10* | (2006.01) | |
| *B65D 59/04* | (2006.01) | |

(52) U.S. Cl.
CPC ........... B65D 25/54 (2013.01); B65D 81/261 (2013.01); B65D 85/187 (2013.01); G06K 7/1413 (2013.01); G06N 20/00 (2019.01); G09F 3/0297 (2013.01); *B65D 2203/06* (2013.01)

(58) Field of Classification Search
CPC .... B65D 2401/00; B65D 25/04; B65D 25/10; B65D 25/205; B65D 25/54; B65D 59/04; B65D 81/18; B65D 81/261; B65D 81/266; B65D 85/187; G06K 7/1413; G06N 20/00; G09F 3/0297
USPC ..... 206/1.5, 204, 216, 223, 232, 292, 308.1, 206/320, 363, 364, 366, 37, 370, 38, 438, 206/449, 454, 457, 459.1, 459.5, 497, 206/509, 521, 522, 523, 524.1, 524.3, 206/569, 570, 6.1, 710, 807
See application file for complete search history.

(56) References Cited

U.S. PATENT DOCUMENTS

| | | | |
|---|---|---|---|
| 3,399,955 A | 9/1968 | Zimmerman | |
| 4,083,483 A * | 4/1978 | Bayless | A47G 25/005 |
| | | | 220/8 |
| 4,819,795 A | 4/1989 | Swaney | |
| 4,973,448 A * | 11/1990 | Carlson | C23F 11/02 |
| | | | 239/34 |
| 5,018,207 A | 5/1991 | Purdum | |
| 5,018,307 A | 5/1991 | Burrous et al. | |
| 5,082,110 A * | 1/1992 | Hager | A63B 47/00 |
| | | | D11/131 |
| 5,220,614 A | 6/1993 | Crain | |
| 5,590,766 A * | 1/1997 | Carnahan | B65D 43/162 |
| | | | 206/292 |
| 6,102,207 A * | 8/2000 | Carse | B65D 85/00 |
| | | | 206/459.1 |
| 6,226,205 B1 | 5/2001 | Guritz | |
| 6,745,496 B2 | 6/2004 | Cassella | |
| 8,908,968 B1 | 12/2014 | Spoor et al. | |
| 9,767,163 B2 | 9/2017 | Kass et al. | |
| 10,942,933 B2 | 3/2021 | Kass et al. | |
| 11,553,105 B2 | 1/2023 | Speasl et al. | |
| 11,834,249 B2 * | 12/2023 | Dolmayan | G06K 7/1413 |
| 2002/0076685 A1 | 6/2002 | Ueno | |
| 2002/0116365 A1 | 8/2002 | Kusin | |
| 2002/0133969 A1 * | 9/2002 | Cassella | D06F 58/10 |
| | | | 34/201 |
| 2004/0211822 A1 | 10/2004 | Lin | |
| 2004/0268130 A1 | 12/2004 | Pretorius | |
| 2005/0092650 A1 * | 5/2005 | Romero | B65D 25/10 |
| | | | 206/775 |
| 2005/0289061 A1 | 12/2005 | Kulakowski et al. | |
| 2006/0102495 A1 | 5/2006 | Mcdowell et al. | |
| 2006/0243625 A1 * | 11/2006 | Biddick | A61N 1/372 |
| | | | 206/459.5 |
| 2008/0023343 A1 | 1/2008 | Macor | |
| 2008/0023351 A1 * | 1/2008 | Macor | B65D 85/58 |
| | | | 206/0.8 |
| 2008/0108537 A1 | 5/2008 | Rees | |
| 2008/0230402 A1 * | 9/2008 | Macor | G06Q 30/018 |
| | | | 235/487 |
| 2009/0119258 A1 | 5/2009 | Petty | |
| 2010/0313037 A1 * | 12/2010 | Ward | G06Q 30/06 |
| | | | 705/50 |
| 2013/0041721 A1 | 2/2013 | Neuendorf | |
| 2014/0014715 A1 | 1/2014 | Moran et al. | |
| 2015/0076015 A1 * | 3/2015 | Dabney | A45C 11/00 |
| | | | 206/278 |
| 2015/0102098 A1 | 4/2015 | Adams | |
| 2015/0127430 A1 | 5/2015 | Hammer | |
| 2015/0134552 A1 | 5/2015 | Engels et al. | |
| 2015/0239636 A1 * | 8/2015 | Chen | B65D 25/54 |
| | | | 206/204 |
| 2016/0019554 A1 | 1/2016 | Macdonald-Korth et al. | |
| 2016/0095400 A1 * | 4/2016 | Lawton | A45C 13/02 |
| | | | 206/278 |
| 2016/0145035 A1 | 5/2016 | Bates | |
| 2016/0146725 A1 | 5/2016 | Bornstein | |
| 2016/0148283 A1 | 5/2016 | Bornstein | |
| 2016/0148284 A1 | 5/2016 | Bornstein | |
| 2016/0210734 A1 | 7/2016 | Kass et al. | |
| 2016/0292695 A1 | 10/2016 | Bornstein | |
| 2017/0148032 A1 | 5/2017 | Corniuk et al. | |
| 2017/0245598 A1 | 8/2017 | Dieter | |
| 2017/0263011 A1 | 9/2017 | Yalniz et al. | |
| 2018/0246895 A1 | 8/2018 | Kass et al. | |
| 2018/0357986 A1 | 12/2018 | Chisholm | |
| 2019/0248538 A1 * | 8/2019 | Goretti | B65D 5/48048 |
| 2021/0158274 A1 | 5/2021 | Patchen | |

FOREIGN PATENT DOCUMENTS

| | | | | |
|---|---|---|---|---|
| GB | 2515302 | * | 12/2014 | ........... B65D 85/187 |
| JP | 3216238 U | * | 5/2018 | ............... A47F 3/00 |

* cited by examiner

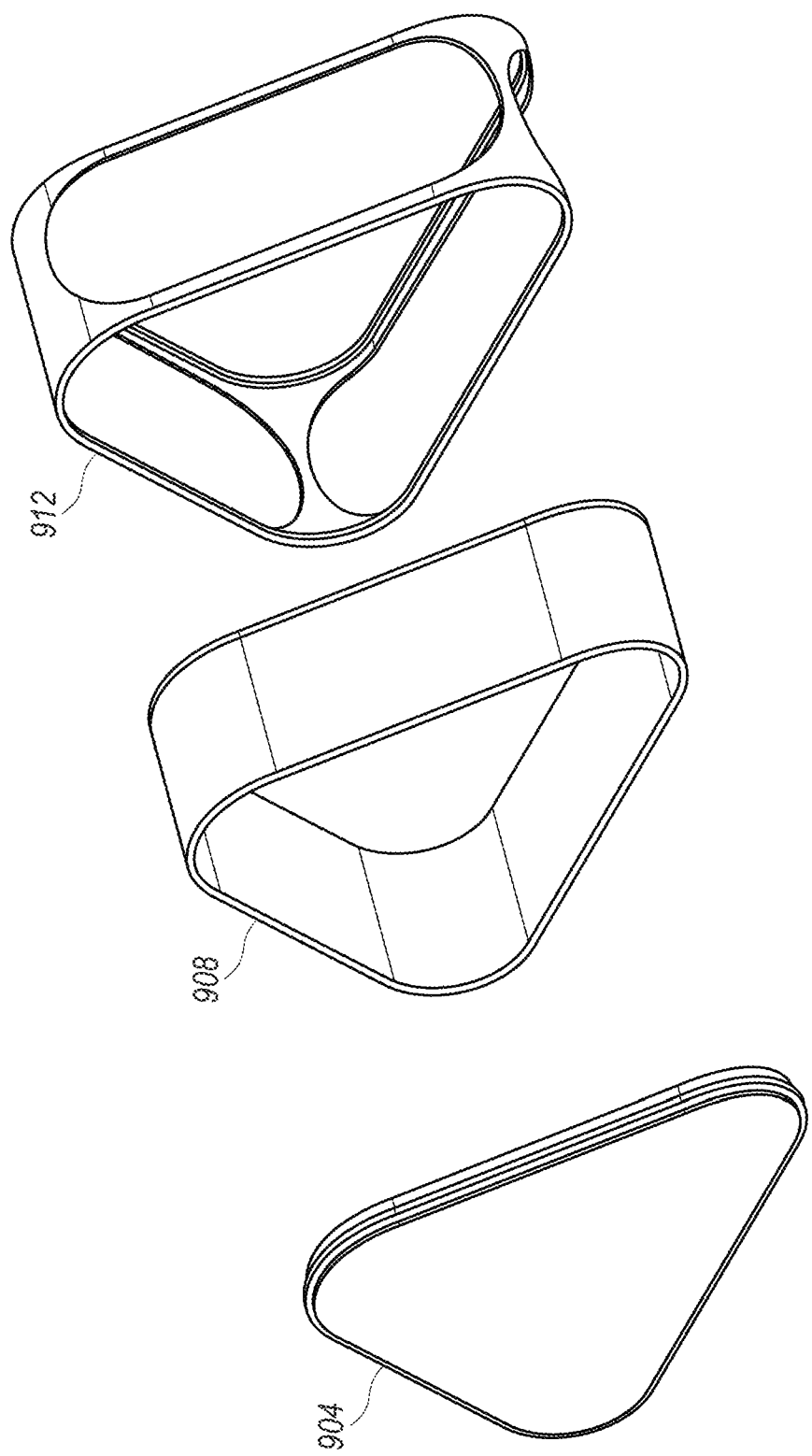

APPARATUS AND SYSTEM FOR AUTHENTICATING, GRADING, AND ENCAPSULATING COLLECTIBLES

CROSS-REFERENCE TO RELATED APPLICATION(S)

This application is a continuation of U.S. patent application Ser. No. 17/368,642 filed Jul. 6, 2021, which claims the benefit of U.S. Provisional Patent Application No. 63/049,011, filed Jul. 7, 2020, which are incorporated by reference in their entireties herein.

TECHNICAL FIELD

This description relates generally to items of interest and value worth collecting by collectors and specifically to apparatus and systems for authenticating, grading, and encapsulating collectibles.

BACKGROUND

The value of collectible items can sometimes vary based on the authenticity, condition, or grade of such items. Authenticity can be established via an item's provenance and/or by comparison of the item with a known authentic item. To the extent that the item lacks a chain of possession sufficient to establish provenance and/or has features that deviate from those of known authentic items, the item may be deemed a counterfeit. The condition of such items is sometimes referred to as the grade of the item. Items can be described as new, used, in excellent condition, and so on. Different grading systems can be applied to various classes of items. However, the assigned grade is of little value if it is not consistently and objectively applied across all such items, such that a fair comparison can be made between the items. For example, an "excellent" item should always be of the same quality.

Further, for an item to retain its value, the grade must be preserved. Excessive (or, in some cases, any) use and/or poor storage of such items can result in degradation of the item's quality. In such cases, the item should be reclassified in a lower grade, resulting in loss of value. This can be a concern because one motivation for collecting such items is to preserve the quality of the item in anticipation of an increase in value over time due to such factors as scarcity and desirability.

It would be advantageous to provide for consistent and reliable authentication, grading, and preservation of collectible items.

SUMMARY

Apparatus and systems for authenticating, grading, and encapsulating collectibles are disclosed. In some embodiments, a system includes a scanning device configured to generate information describing authenticity and a grade of a collectible scanned by the scanning device. A computer device is communicably coupled to the scanning device and configured to extract a feature vector from the information. The feature vector includes a first set of features and a second set of features. The first set of features is matched to authenticity profiles of collectible items. Each authenticity profile of the authenticity profiles characterizes at least one collectible item of the collectible items across multiple features. A confidence score is generated with respect to the authenticity of the collectible based on the authenticity profiles. The second set of features is matched to grade profiles of the collectible items. A grade score describing the grade of the collectible is generated based on the grade profiles. The grade of the collectible is determined based on the grade score. A display device is communicably coupled to the computer device and configured to generate a graphical representation of the grade and the confidence score.

In some embodiments, a computer system generates information describing authenticity and a grade of a collectible scanned by a scanning device. A feature vector is extracted from the information. The feature vector includes a first set of features and a second set of features. The computer system matches the first set of features to authenticity profiles of collectible items. Each authenticity profile characterizes at least one collectible item across multiple features. The computer system generates a confidence score with respect to the authenticity of the collectible based on the authenticity profiles. The computer system matches the second set of features to grade profiles of the collectible items. A grade score describing the grade of the collectible is generated based on the grade profiles. The computer system determines the grade of the collectible based on the grade score. A graphical representation of the grade and the confidence score is transmitted to a display device.

In some embodiments, a computer-readable non-transitory storage medium stores computer instructions, which when executed by one or more computer processors cause the one or more computer processors to generate information describing authenticity and a grade of a collectible scanned by a scanning device. A feature vector is extracted from the information. The feature vector includes a first set of features and a second set of features. The first set of features is matched to authenticity profiles of collectible items. Each authenticity profile characterizes at least one collectible item across multiple features. A confidence score is generated with respect to the authenticity of the collectible based on the authenticity profiles. The second set of features is matched to grade profiles of the collectible items. A grade score describing the grade of the collectible is generated based on the grade profiles. The grade of the collectible is determined based on the grade score. A graphical representation of the grade and the confidence score is transmitted to a display device.

In some embodiments, a case includes a first shell dimensioned to encapsulate a portion of a collectible. The first shell includes a planar first end having a recessed first edge. A wall is attached to the planar first end at the first edge of the planar first end. The wall is dimensioned to surround the portion of the collectible. A shoe tree includes a foot-shaped portion dimensioned to be inserted into the collectible. The shoe tree is configured to support the collectible. An end portion is attached to the foot-shaped portion and configured to rest against the wall, such that the first shell supports the shoe tree. A stabilizer is configured to rest against the wall, such that the first shell supports the stabilizer. The stabilizer holds the collectible against a counterpart collectible encapsulated by the case. A second shell is configured to seal the case. The second shell includes a planar second end dimensioned to be placed on a lip of the wall, such that the collectible is encapsulated by the case. The planar second end has a recessed second edge dimensioned to align with the recessed first edge, such that the case is configured to be stacked on a counterpart case.

In some embodiments, a case includes a first shell dimensioned to encapsulate a portion of a collectible. The first shell includes a planar first end. A wall is attached to the planar first end at an edge of the planar first end. The wall is dimensioned to surround the portion of the collectible. A second shell is configured to seal the case. The second shell includes a planar second end dimensioned to be placed on the wall, such that the collectible is encapsulated by the case.

These and other aspects, features, and implementations can be expressed as methods, apparatus, systems, components, program products, means or steps for performing a function, and in other ways.

These and other aspects, features, and implementations will become apparent from the following descriptions, including the claims.

BRIEF DESCRIPTION OF THE DRAWINGS

FIG. 9B illustrates a perspective view of a case for encapsulating collectibles, in accordance with one or more embodiments.

DETAILED DESCRIPTION

Figure 1:
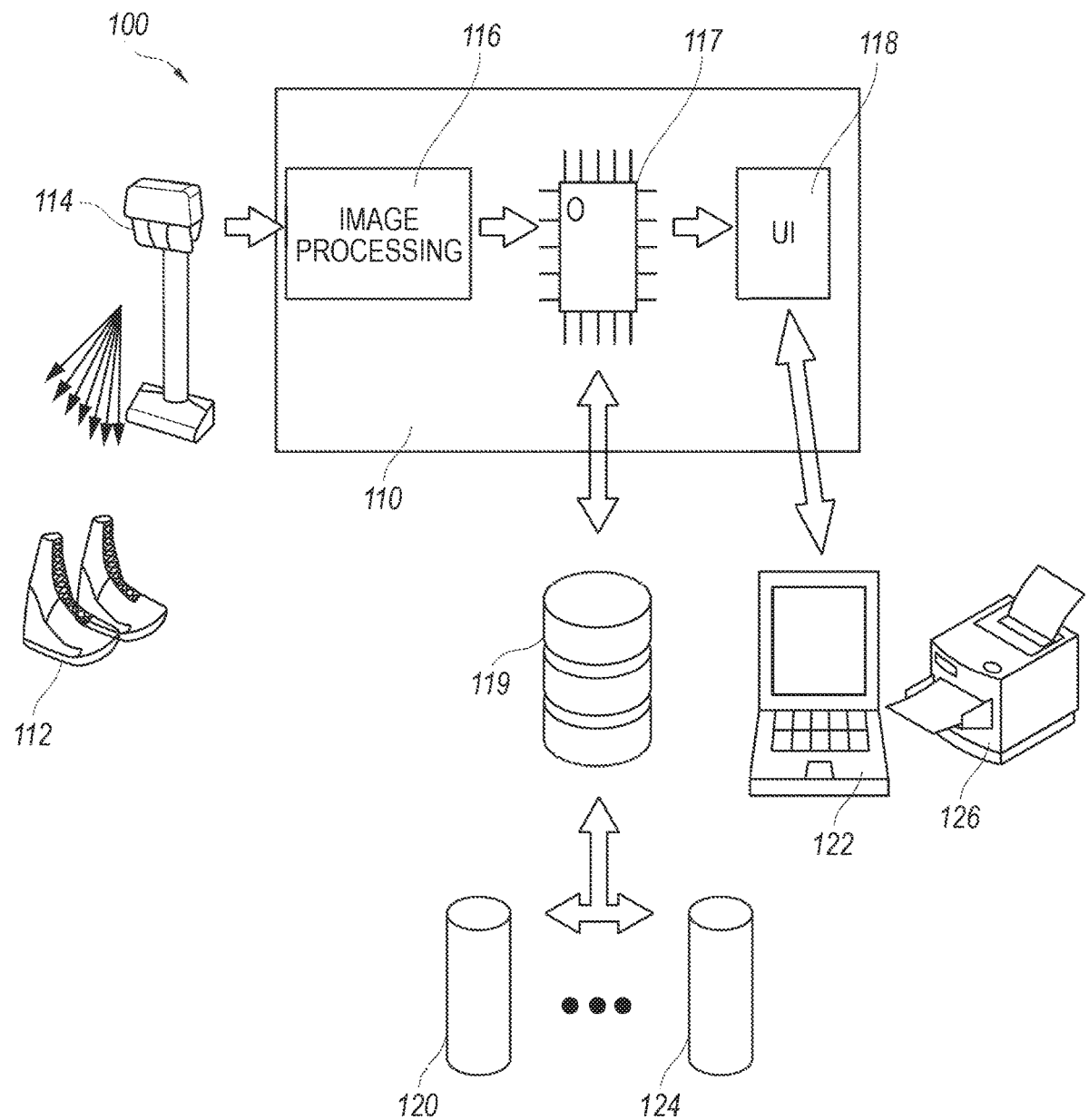
FIG. 1 is a block diagram illustrating a system for authenticating, grading, and encapsulating collectibles, in accordance with one or more embodiments.

In the following description, for the purposes of explanation, numerous specific details are set forth in order to provide a thorough understanding of the present embodiments. It will be apparent, however, that the present embodiments may be practiced without these specific details.

This document presents systems and apparatus for authenticating, grading, and encapsulating collectibles. A collectible refers to an item of interest to a collector or an item valued and sought by collectors, for example, unique sports shoes, figurines, baseball cards, coins, toys, dolls, etc. To determine a collectible's value, it is authenticated and graded. Grading refers to a process of determining the grade or condition of a collectible, one of the key factors in determining its value. For example, a collectible's grade can be determined by criteria, such as preservation, luster, color, or attractiveness.

Authentication refers to a process of determining that a collectible is a genuine unique item or a genuine, legal copy. Authentication can be based on verifying specific details about the collectible, such as when and how it was produced, the names of people or companies involved in the collectible's production, the dimensions of the collectible, or the names of reference books, magazines, or similar resources that contain either specific or related information about either that collectible or the artist. The authentication process can result in an authenticity certificate or label that states the qualifications and full contact information of an entity that authored the certificate. The label or certificate can have a license number on it. Encapsulation refers to storage of a collectible within a case or cover in a manner to protect it from wear and the environment, e.g., direct sunlight, humidity, etc.

The advantages and benefits of the systems and apparatus for authenticating and grading collectibles using the embodiments described herein include prevention of fraud, valuation of the collectibles for insurance purposes, and automated determination of value. Moreover, the provenance and grade can be digitally stored and transmitted with the collectible. The advantages and benefits of the apparatus for encapsulating collectibles using the embodiments described herein include prevention of wear, storage at a consistent temperature, and storage at a consistent relative humidity. The case for encapsulating collectibles disclosed herein avoids direct sunlight, prevents warping, and is able to display the collectible. Moreover, mold and pest damage and contact damage is prevented. The design of the shoe tree disclosed maintains the collectible's shape and avoids creasing of its materials. The shoe tree also absorbs moisture in the collectible, prevents odors, and provides stability to the collectible for display. Further, the disclosed stabilizer pushes the collectibles apart and prevents sole-to-sole contact, thus protecting the collectibles from wear and preserving their grade. The disclosed security tabs break open to indicate when the case has been opened or tampered with. Thus, the security tabs 504, 508 provide indications of whether a collectible needs to be regraded.

FIG. 1 is a block diagram illustrating a system 100 for authenticating, grading, and encapsulating collectibles 112, in accordance with one or more embodiments. The system 100 can be implemented using components of the example computer system 800 illustrated and described in more detail with reference to FIG. 8. Likewise, other embodiments include different and/or additional components, or are connected in a different manner.

In some embodiments, the system 100 includes a scanning device 114 that is configured to generate information describing authenticity and a grade of a collectible 112 scanned by the scanning device 114. From the scanning device 114, the computer device 110 receives information about the collectible 112, such as item's features, dimensions of the item, colors, textures, and spectral and other non-destructively obtained information regarding the materials from which the collectible 112 is made. The computer device 110 receives the scanned information and processes such imaged information to categorize such information.

An example collectible 112 depicted in FIG. 1 is a pair of shoes. Collectible shoes can include basketball shoes, cleats, dress shoes, etc. The system 100 can authenticate and grade different types of collectibles other than shoes, such as books, CDs, posters, antiques, etc. In some embodiments, the scanning device 114 is configured to generate the information using at least one of light, sound, or x-rays. For example, the scanning device can be a camera, a video camera, an infrared camera, an optical scanner, an x-ray scanner, a microphone that senses audio signals, an ultrasound machine, etc. The information generated by the scanning device 114 is digital information and can represent a brand name, imperfections (e.g., inconsistent colors in panels, stitching errors, excessive glue in assembly, creases in leather, etc.), or provenance information scanned from a quick response (QR™) code embedded in or printed on the collectible. In other embodiments, the scanning device 114 is not part of the system 100; the system 100 received the information from the scanning device 114.

The system 100 can include or interface with a computer network that includes any combination of one or more local networks (e.g., an Ethernet network) coupled using wired or wireless links. The information is exchanged over the computer network and is transferred using any number of network layer protocols, such as Internet Protocol (IP), Multiprotocol Label Switching (MPLS), Asynchronous Transfer Mode (ATM), Frame Relay, etc. The computer network can be built using components of the example computer system 800 illustrated and described in more detail with reference to FIG. 8.

The system 100 includes the computer device 110 communicably coupled to the scanning device 114 (e.g., over the computer network). The computer device can be a workstation, cloud server, personal computer (PC), or mobile device. The computer device 100 includes at least one processor 117 and memory, and is implemented using components of the example computer system 800 illustrated and described in more detail with reference to FIG. 8. The computer device 100 includes an image processing module 116, a processor 117, and a user interface module 118. Likewise, other embodiments of the computer device 110 include different and/or additional components, or are connected in a different manner.

The processor 117 receives the processed image information and by category, etc., such as color, shape, features and the like, applies the information to a database 119. The computer device 110 is configured to extract a feature vector from the information generated by the scanning device 114. The feature vector is a collection of individually measurable properties or characteristics (e.g., corners, edges, etc.) of the collectible 112. The features of the feature vector are informative, discriminating, and independent for pattern recognition, classification, and regression by the computer device 110. For example, the features can be numeric or structural. The feature vector includes a first set of features (describing a shape, a color of at least one panel, a logo of the collectible, a tread pattern, etc., of the collectible 112) and a second set of features (describing minor imperfections, such as inconsistent colors in panels, stitching errors, excessive glue in assembly, creases in leather, or an amount of physical wear of the collectible 112).

In some embodiments, the first set of features extracted from the scanned information by the computer device 110 describe at least one of a shape, a color of at least one panel, a logo, a tread pattern, a coloration, spectral features, a size, a brand, a make, or a model of the collectible 112. The shape of the collectible 112 can be rectangular, triangular, circular, or any arbitrary shape. For example, when the collectible 112 is a pair of shoes, the shape describes the toe cap, upper (vamp, tongue, or eyelets), heel, sole (insole, outsole, or midsole), shank, welt, waist, throat, puff, quarters, or lining. The color of each panel of the collectible 112 can be described, e.g., red, green, etc. The logo of the collectible 112 refers to the manufacturer's or retailer's logo. The read pattern of the collectible 112 describes deepness of cleats, space between lugs, rock plate, nylon shank, heel-to-toe drop, pattern of tread, etc.

The coloration of the collectible 112 refers to the color characteristics, color variation, color gradient, and range of position-dependent colors of the collectible 112. The spectral features of the collectible 112 refer to features derived by the processor 117 from spectral analysis in terms of a spectrum of frequencies or related quantities such as energies, eigenvalues, etc. For example, the computing device 110 can estimate the strength of different frequency components (the power spectrum) of a time-domain signal generated by the scanner. The size of the collectible 112 refers to the estimated or computed dimensions of the collectible 112 by the computer device 110, e.g., length, width, height, diameter, angular nature, etc. A size of different components of the collectible 112, such as sole, laces, upper, etc., can be determined from the first set of features extracted from the scanned information. The brand, make, and model of the collectible 112 can be determined from text or logo recognition of scanned words or names on the collectible, e.g., Nike. The brand, make, and model can also be determined from size, shape, color, and design of the collectible by matching the feature vector against the authenticity profiles 120.

The computer device 110 matches the first set of features to stored authenticity profiles 120 of collectible items (e.g., authenticated, similar times to the collectible 112). For example, the authenticity profiles 120 can be stored in the database 119 that may or may not be part of the system 100. The computer device 110 communicates with the database 119 over the computer network. The database 119 is implemented using components of the example computer system 800 illustrated and described in more detail with reference to FIG. 8. Each authenticity profile of the stored authenticity profiles 120 characterizes at least one collectible item (e.g., a basketball shoe) of the collectible items across multiple features, e.g., brand, color, etc.

In some embodiments, the computer device 110 generates a confidence score with respect to the authenticity of the collectible 112 based on the authenticity profiles 120. For example, the image processing module 116 determines from the first set of features how well the pieces of the collectible 112 fit together, whether there is evidence of excess glue on the collectible 112, or whether an image of the collectible 112 reveals that elements of the collectible are separating, etc. The confidence score reflects a quality of the match between the first set of features and the stored authenticity profiles 120. The confidence score can be a number from 0 to 10 (e.g., 4.775) or a percentage number from 0 to 100 (e.g., 76.485%). A higher confidence score denotes that the collectible 112 has a greater likelihood of being authentic.

The processor 117 thus attempts to match the processed image information against the authenticity profiles 120 and determine the confidence score with regard to authenticity. That is, if a confidence score threshold is passed with regard to a match between the scanned collectible 112 and an authenticity profile of an authentic item in the database 119, then the item is deemed to be authentic and the user interface module 118 communicates this information to the display device 122. In the case of basketball shoes, an authenticity profile would be stored for each model of shoe and the scanned collectible 112 would be matched against these authenticity profiles 120 to identify and authenticate the collectible 112.

In some embodiments, the computer device 110 is further configured to receive provenance information of the collectible 112 from the database 119. The provenance refers to the history of ownership and identity (e.g., date, place, and manufacturer, etc.). The provenance information can include a list of trades or sales of the collectible 112 and changes in ownership. The confidence score is further based on the provenance information. For example, the provenance information of the collectible 112 can be received from a facility where the collectible 112 was manufactured. The provenance information can be generated by at least one vision system monitor in the facility.

In some embodiments, the computer device 110 uses the feature vector to determine a unique identity of the collectible 112. For example, the collectible 112 may not be a genuine item but can be a very valuable, one-of-a-kind copy or counterfeit. In such cases, the image processing module 116 determines based on the feature vector and the authenticity profiles 120 a unique identity of the collectible 112. For example, a grade of a collectible, in general applies only to a unique item. Thus, a particular basketball shoe can be authentic, but there can be thousands of those authentic items. The particular basketball shoe having a particular brand and model with a particular grade assigned by the system 100 is unique. The grade applies to only that particular shoe. Similarly, even if the collectible 100 is not authentic, it can have a unique identity that is determined based on the feature vector. The grade of the collectible 112 applies only to the particular collectible 112 and the grade is independent of the collectible 112's authenticity.

Once a collectible 112 is authenticated, it is graded objectively. The scanned information includes information with regard to minor imperfections, such as inconsistent colors in panels, stitching errors, excessive glue in assembly, creases in leather, or wear if such imperfections are present. The second set of features are determined from the processed image information and each of the factors that are used to determine imperfections are derived and compared to grade profiles stored in the database 119. Each factor can be assigned a grade score and the scores for all of the factors combined to produce an overall grade score. The grade score is used to assign an alphanumeric grade to the item. Thereafter, the user interface module 118 communicates this information to the display device 122.

In some embodiments, the computer device 110 matches the second set of features to stored grade profiles 124 of the collectible items. In some embodiments, the second set of features describe minor imperfections, such as inconsistent colors in panels, stitching errors, excessive glue in assembly, creases in leather, fading of colors, consistency of colors across material, surface texture, finish, or lace quality of the collectible 112 (e.g., for shoes). The colors in the panels, e.g., for a shoe, describes different colors of the toe, heel cap, lace panels, main body of the shoe, etc. The stitching errors include frayed thread, the distance of a stitch from the edge of a fabric panel, coloration of a thread, missed stitches, inconsistent length of stitches, inconsistent distance between stitches, etc. The excessive glue in assembly of shoes results from too much glue or other chemicals used in production or excess material left on the shoes after production. The creases in the leather, e.g., of shoes can result from quality of the leather, bending of shoes, moisture, etc.

The fading of colors refers to loss of coloration due to wear, aging, excess incident light, or scuffing. The consistency of colors refers to color modulation across the material or fabric of the collectible 112, e.g., due to possible bleaching, staining, or soaking. The surface texture of the collectible 112 refers to the surface finish as defined by the three characteristics of lay, surface roughness, and waviness. The image processing module 116 determines a set of metrics (second set of features) from the feature vector to quantify the perceived texture of the collectible 112, e.g., the spatial arrangement of color or intensities in the image or selected region of an image of the collectible 112. For segmentation of the image by the image processing module 116, features, such as spatial frequency and average grey level can be used. For example, skateboarding shoes (e.g., Vans) and women's designer shoes can be collectibles for which surface texture is important.

The stitching quality of the collectible 112, e.g., for collectible shoes, clothes, or jackets, refers to the stitch length (e.g., a distance from one stitch juncture to the next successive stitch juncture in the sewing line), stitch width (e.g., a distance between the outermost stitch juncture or distance between the outermost edges of the lateral thread placement), frayed thread, distance of a stitch from the edge of a fabric panel, coloration of thread, etc. The finish of the collectible 112 refers to the surface quality of its materials, e.g., from washing, creaming, or polishing the uppers, or inking, heel-balling, or polishing the edges of the sole and the heel. The lace quality of the collectible 112 (e.g., for shoes) refers to physical quality and design of the rawhide, cotton, or braided nylon used for the laces.

The grade profiles 124 include stored information denoting the quality and color of the collectible items. The grade profiles 124 are stored in the database 119. Example grade profiles 124 for the collectible items include data reflecting which features are associated with different grading tiers in ascending or descending order of preservation. Matching the second set of features includes color matching to a baseline expectation for the collectible 112.

The computer device 110 generates a grade score describing the grade of the collectible 112 based on the grade profiles 124. The grade score is numeric or alphanumeric. The computer device determines the grade of the collectible 112 based on the grade score. In some embodiments, the grade profiles 124 specify a range of points arranged in increments, e.g., 000, 100, 200, . . . 999. The grade score is associated with a designation and a particular number of points (e.g., 568) within the range of points.

Embodiments of the invention concern the grading of collectible items. One presently preferred embodiment concerns the grading of collectible shoes, such as basketball shoes. An exemplary method for shoe grading implements a 1000-point grading system with ten-point increments. Different designations are applied depending on the shoe's authenticity and use, for example:

NW—never worn
SW—slightly worn
WW—well worn

A collectible shoe can have any one of these designations along with a number of points, e.g., NW/560, NW/800, SW/340, etc. In some embodiments, there are different grades for each of the left shoe, the right shoe, and each of the laces. The individual grades can be combined to create an overall grade for the pair of shoes and laces. Further, because there are many counterfeits that are also collectible, some embodiments include a counterfeit grade as well:

CNW—counterfeit never worn
CSW—counterfeit slightly worn
CWW—counterfeit well worn For example, CSW/800, CWW/980, etc., are grades that can be used. Some embodiments implement a technical solution that can detect counterfeits. In some embodiments, shoes are attached with a grade. There are multiple criteria applied to determine grade, including, but not limited to:

Overall eye appeal
Stitching
Laces
Imperfections
Clarity
Use/non-use

Some embodiments provide a signature line, as well as signature authenticating. In embodiments, such signature line has a different colored label and/or additional designations. In some embodiments, the confidence score is determined based on the first set of features and the authenticity profiles 120 using supervised learning. The supervised learning is implemented using labeled training sets having known authentic and inauthentic collectible profiles provided by experts. The computer device 110 is further configured to receive the confidence score from labeled training data provided by an expert. For example, an expert can map an input to an output based on example input-output pairs. The expert creates labeled training data including a set of training examples. Each example is a pair including an input object (typically a vector) and a desired output value (also called a supervisory signal). The expert analyzes the feature vector, determines authenticity of the collectible 112, and produces an inferred function, which can be used for mapping new examples. Eventually, a machine learning module determines the class labels for unseen instances. The machine learning module is trained by the expert to generalize from the training data to unseen situations, measured through a generalization error. In some embodiments, the computer device 110 is further configured to receive the grade score from labeled training data provided by an expert. The expert provides the labeled training data and grade score based on the second set of features.

In some embodiments, the computer device 110 includes a machine learning module configured to provide the confidence score based on the first set of features. The machine learning module is trained based on the authenticity profiles 120. In some embodiments, the machine learning module is configured to provide the grade score based on the second set of features. The machine learning module is trained based on the grade profiles 124. The machine learning module encapsulates a specific machine learning algorithm, function, or code library that builds a model based on the authenticity profiles 120 and/or the grade profiles 124, known as "training data," in order to make predictions or decisions without being explicitly programmed to do so. The machine learning module applies machine learning techniques to generate a machine learning model that, when applied to extracted features, outputs indications of whether the features have an associated property (e.g., authenticity). As part of the generation of the machine learning model, the machine learning module forms a training set of features by identifying a positive training set of features that have been determined to have the property in question, and, in some embodiments, forms a negative training set of features that lack the property in question.

In one embodiment, the machine learning module applies dimensionality reduction (e.g., via linear discriminant analysis (LDA), principle component analysis (PCA), or the like) to reduce the amount of data in the features for content items to a smaller, more representative set of data. The machine learning module uses supervised machine learning to train the machine learning model, with the features of the positive training set and the negative training set serving as the inputs. Different machine learning techniques—such as linear support vector machine (linear SVM), boosting for other algorithms (e.g., AdaBoost), neural networks, logistic regression, naïve Bayes, memory-based learning, random forests, bagged trees, decision trees, boosted trees, or boosted stumps—may be used in different embodiments. The machine learning model, when applied to the features extracted, outputs an indication of whether the features have the property in question.

The system 100 includes a display device 122 communicably coupled to the computer device 110. The display device 122 is configured to generate a graphical representation of the grade and the confidence score. The grade is independent of the authenticity; hence, two separate feature sets are used to determine authenticity (confidence score) and grade. The display device 122 can be an LCD screen, an LED screen, a monitor, etc.

In some embodiments, the computer device is further configured to compare and determine that the confidence score is less than a confidence score threshold. For example, a confidence score threshold of less than 99% indicates that the collectible is not authentic. If the determined confidence score of the collectible by the computer device 110 is 98.99%, the computer device 110 transmits a message to the display device 122. For example, the message can indicate that the collectible 112 is a close match, a counterfeit, a known line of valuable copies, etc. The message is based on data obtained from the authenticity profiles 120. For example, if it is determined that the collectible 112 is not authentic, i.e., the collectible 112's features do not match the authenticity profile of an authentic item, then a determination is made whether the collectible 112 is a collectable counterfeit. If so, the collectible 112 is deemed to be a collectable counterfeit and the user interface module 118 communicates this message to the display device 122. In the case of basketball shoes, an authenticity profile would be provided for each model of collectable counterfeit shoe and the scanned collectible 112 would be matched against these authenticity profiles to identify and identify the collectible 112 as a collectable counterfeit shoe.

In some embodiments, the system 100 includes a printing device 126 communicably coupled to the computer device 110. The printing device 126 is configured to print a label onto a case encapsulating the collectible 112. The printing device 126 can be a thermal label printer, a barcode printer, or a printer that prints text and an image of the collectible 112. The label is the same as or similar to the label 208 illustrated and described in more detail with reference to FIGS. 2-3. The case is the same as or similar to the case 600 illustrated and described in more detail with reference to FIG. 6. The label specifies at least one of the grade or the confidence score of the collectible 112. The label is readable by the scanning device 114. For example, the label can include a QR™ code that specifies a make, model, brand, grade, or provenance of the collectible 112. The QR™ code is the same as or similar to the QR™ code 312 illustrated and described in more detail with reference to FIG. 3.

In some embodiments, a digital score or digital grade is determined by the computer device. The digital score or grade can be added via near-field communication (NFC), Bluetooth Low Energy (BLE), radio-frequency identification (RFID), etc., to the case. For example, the system 100 stores the digital score on a case encapsulating the collectible 112 using at least one of NFC, BLE, or RFID. NFC refers to a set of communication protocols for communication between, e.g., an electronic device embedded in the case and the scanning device 114 over a distance of 4 centimeters (cm) or less. The NFC device embedded in or attached to the case can be an electronic identity document or keycard. BLE refers to a wireless personal area network technology that can be used to store and read details about the collectible 112 with reduced power consumption and cost while maintaining a similar communication range. RFID refers to the use of electromagnetic fields to automatically identify and track tags attached to the case. When triggered by an electromagnetic interrogation pulse from the scanning device 114 (or other RFID reader device), the tag on the case transmits digital data about the collectible 112 to the reader. The RFID tag attached to the case can be a passive tag powered by energy from the RFID reader's interrogating radio waves or an active tag powered by a battery. The NFC, BLE, or RFID device is the same as or similar to the digital storage device 540 illustrated and described in more detail with reference to FIG. 5A.

Figure 2:
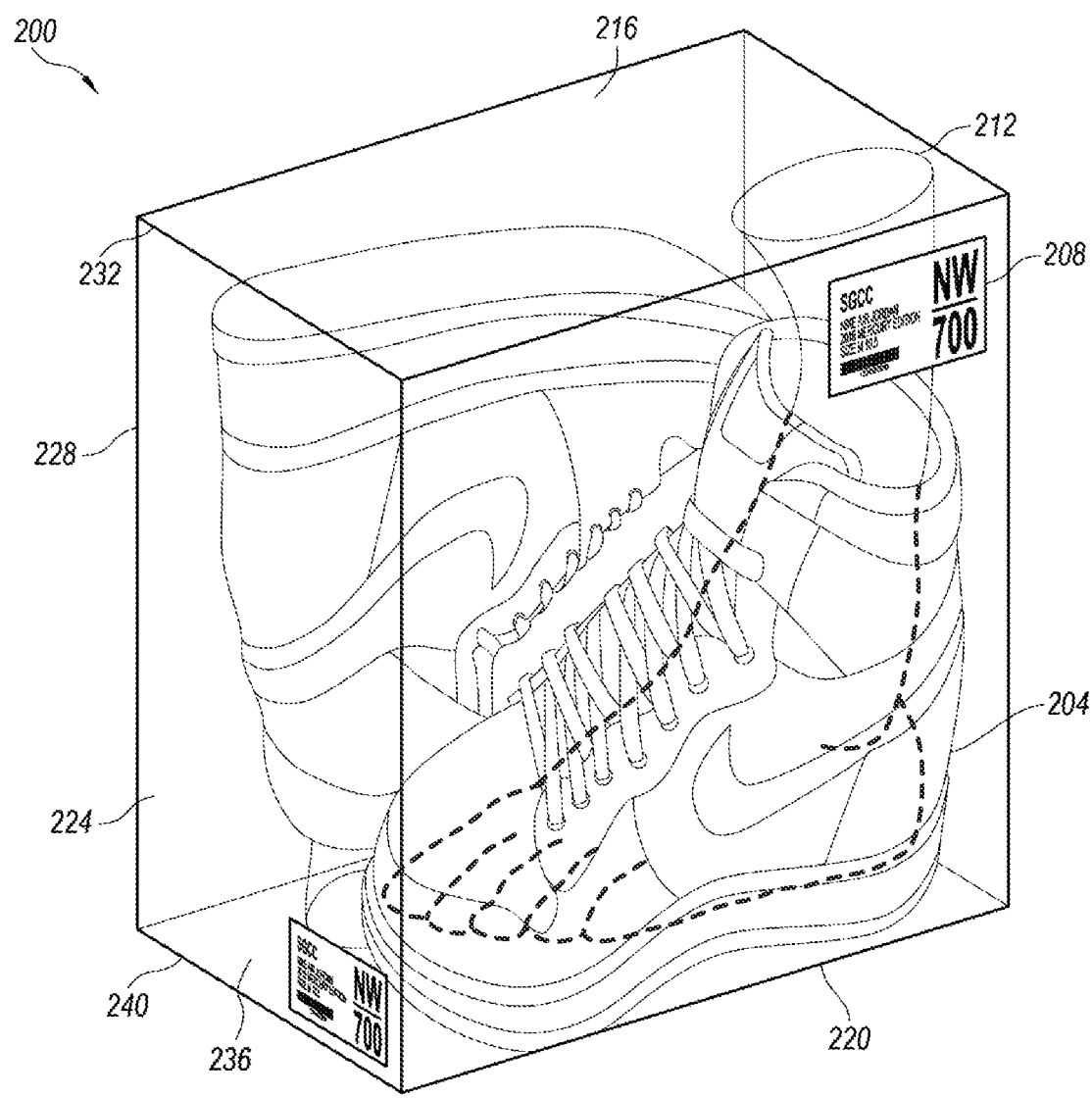
FIG. 2 illustrates a perspective view of an authenticated, graded, and encapsulated collectible, in accordance with one or more embodiments.

FIG. 2 illustrates a perspective view of an authenticated, graded, and encapsulated collectible 204, in accordance with one or more embodiments. The collectible 204 is encapsulated in a case 200, which can have a rectangular cuboid shape, a cubed shape, a spherical shape, a cylindrical shape, or a triangular shape (as illustrated with respect to the case 500 with reference to FIG. 5A). The case 200 can be made of acrylic, plastic, acrylonitrile butadiene styrene (ABS), metal, wood, glass, Pyrex, etc. ABS is a thermoplastic polymer having rigidity, toughness, and impact resistance. Pyrex is a line of clear, low-thermal-expansion borosilicate glass.

The case 200 includes a first, three-dimensional shell 228 dimensioned to encapsulate a portion of the collectible 204. In some embodiments, the shell 228 encapsulates the entire collectible 204. The first shell 228 includes a planar first end 216 and at least one wall 224 attached to the planar first end 216 and 224 at a first edge 232 of the planar first end 216. In some embodiments, the planar first end 216 is rectangular, square shaped, circular, triangular, hexagonal, etc. The wall 224 (along with other walls of the case 200) is dimensioned to surround the portion of the collectible 204. The first shell 228 thus defines a three-dimensional space within the case 200. The case 200 is sized to contain the collectible 204 within the three-dimensional space.

In some embodiments, the case 200 includes a shoe tree 212. A foot-shaped portion of the shoe tree 212 is placed inside the collectible 204 to maintain the collectible 204's shape and avoid creasing of the materials. The shoe tree also absorbs moisture in the collectible 204 and prevents odors. The shoe tree 212 also provides stability to the collectible 212 for display.

The case 200 includes a second shell 220 configured to seal the case 200. The second shell 220 includes a planar second end 236 dimensioned to be placed on a lip 240 of the wall 224, such that the collectible 204 is encapsulated by the case 200. In some embodiments, the planar second end 236 is rectangular, square shaped, circular, triangular, hexagonal, etc. In some embodiments, the first shell 228 or the second shell 220 is transparent, such that the collectible 204 can be viewed from outside the case 200. In some embodiments, the case 200 is further configured to be substantially airtight when the case 200 is sealed by the second shell 220. For example, the case 200 can be completely airtight (hermetically sealed to prevent any passage of air or other gases), vacuum sealed, sealed using a valve, or lightly sealed allowing a small airgap. For example, the airgap can permit 1%, 2%, 5%, or 10% of the air within the case 200 to escape into the environment per hour.

In some embodiments, the case 200 is filled with an inert gas selected to reduce degradation of the collectible 204. For example, the non-reactive properties of the inert gas is used to prevent undesirable chemical reactions from taking place within the case 200, prevent bacteria from growing within the case 200, prevent chemical oxidation, minimize fire hazards, and avoid degradation of the collectible 204. The insert gas used can be humidified argon, helium, neon, krypton, xenon, etc.

Figure 3:
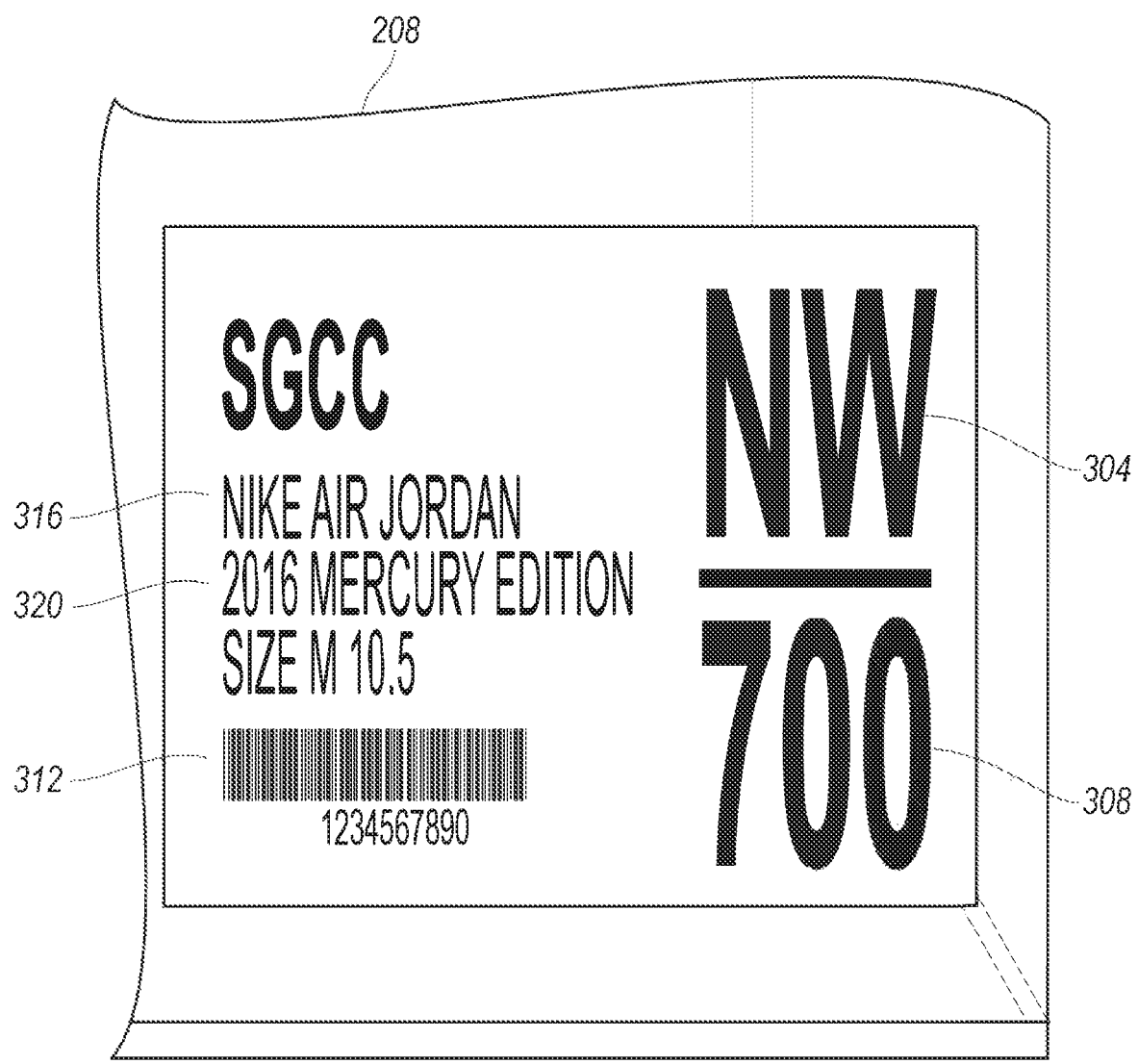
FIG. 3 illustrates a label for an authenticated, graded, and encapsulated collectible, in accordance with one or more embodiments.

FIG. 3 illustrates a label 208 for an authenticated, graded, and encapsulated collectible, in accordance with one or more embodiments. The collectible is the same as or similar to the collectible 112 illustrated and described in more detail with reference to FIG. 1.

The label 208 can be imprinted on or secured by an adhesive to a first shell or a second shell that is used to encapsulate the collectible. For example, the first shell is the same as or similar to the first shell 228 illustrated and described in more detail with reference to FIG. 2. The second shell is the same as or similar to the second shell 220 illustrated and described in more detail with reference to FIG. 2. In some embodiments, the label 208 is printed by a printing device, e.g., the printing device 126 illustrated and described in more detail with reference to FIG. 1. The label is printed by the printing device 126 on paper or adhesive tape and affixed to a case used to store the collectible. The case is the same as or similar to the case 200 illustrated and described in more detail with reference to FIG. 2.

In some embodiments, the label 208 is configured to be scanned by a scanning device to provide at least one of the grading notes of the collectible, an image of the collectible, provenance information of the collectible, manufacturer information of the collectible, or a link to an online marketplace for the collectible. The scanning device is the same as or similar to the scanning device 114 illustrated and described in more detail with reference to FIG. 1. The grading notes of the collectible can specify information describing a grade of the collectible, information with regard to imperfections, grade profiles, a grade score, or a grade of the collectible as described in more detail with reference to FIG. 1. The provenance information of the collectible specifies a brand or make 316 of the collectible, a model 320 of the collectible, a location and date of manufacture, a record of ownership and changes in ownership, a record of transportation of the collectible, or a change in monetary value of the collectible.

The information with regard to imperfections can specify minor imperfections, such as inconsistent colors in panels, stitching errors, excessive glue in assembly, creases in leather, whether the collectible is used or whether there are known and documented areas of physical wear. The information with regard to grade profiles can specify which stored grade profiles match the collectible. The stored grade profiles are the same as or similar to the grade profiles 124 illustrated and described in more detail with reference to FIG. 1. The information with regard to grade score can specify known imperfections, documented fading of colors, worn surface textures, etc. The information with regard to a grade of the collectible can specify a grading tier, a particular number of points 308 (e.g., 700, 568, etc.), a designation 304 (e.g., NW—never worn, SW—slightly worn, WW—well worn, etc.), a counterfeit grade (e.g., CNW—counterfeit never worn, CSW—counterfeit slightly worn, CWW—counterfeit well worn, etc.), or factors such as overall eye appeal, stitching, laces, clarity, etc.

In some embodiments, the label 208 includes a quick response (QR™) code 312. The QR™ code 312 specifies a grade of the collectible or a unique identity of the collectible. For example, the grade of the collectible applies to a unique item. The collectible may be authentic but one among thousands of authentic, similar items. The particular collectible with the grade (QR™ code) assigned is unique. The grade applies to only the particular collectible. The system disclosed herein grades/authenticates a specific collectible and assigns that collectible its own identity. The QR™ code 312 or the label 208 is readable by the scanning device.

Figure 4:
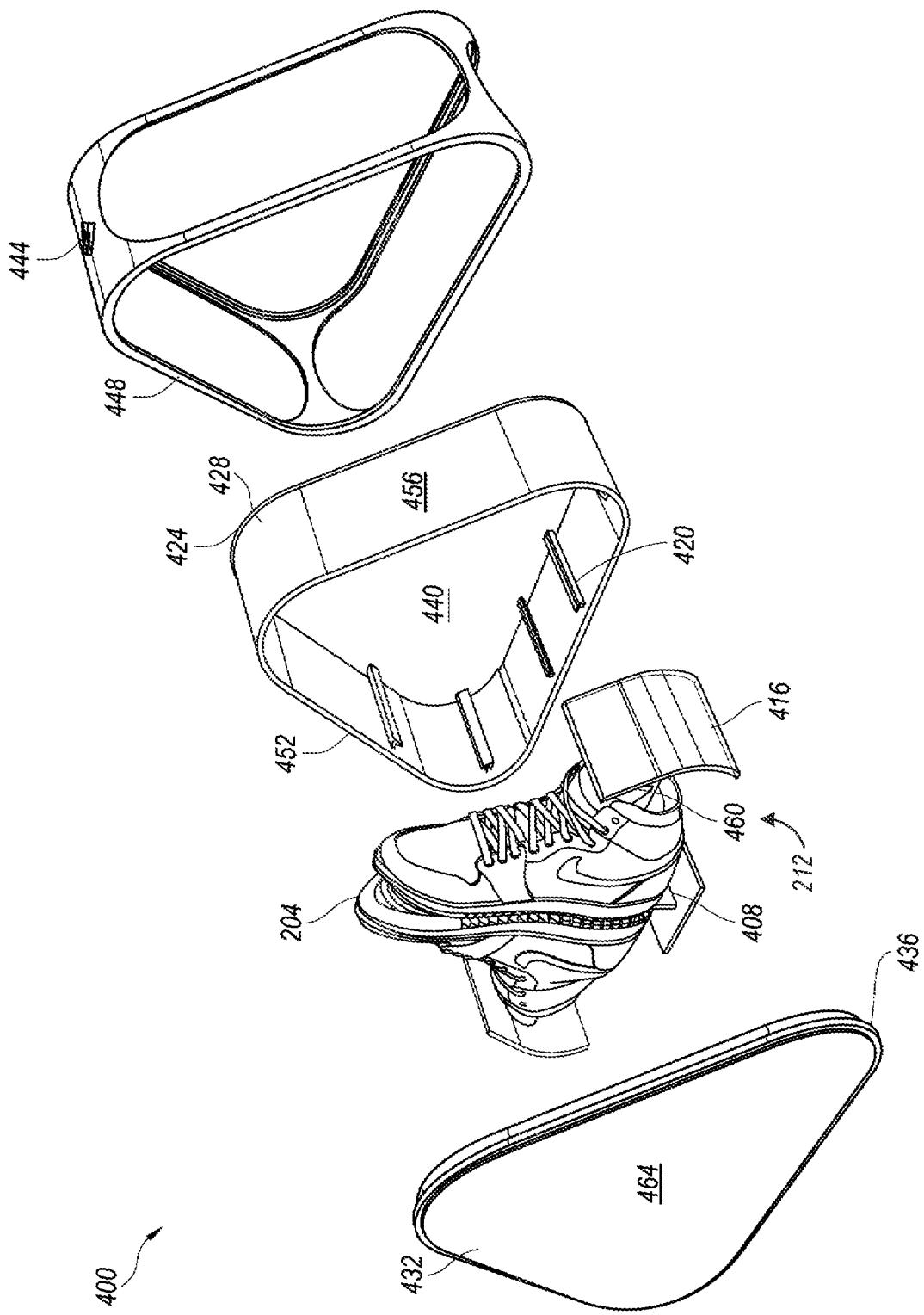
FIG. 4 illustrates a perspective view of components of a case for encapsulating collectibles, in accordance with one or more embodiments.

FIG. 4 illustrates a perspective view of components 400 of a case for encapsulating a collectible 204, in accordance with one or more embodiments. The collectible 204 is illustrated and described in more detail with reference to FIG. 2. The components 400 include a first shell 428, a second shell 432, a shoe tree, and a stabilizer 408.

The first shell 428 is dimensioned to encapsulate a portion of the collectible 204. The first shell 428 includes a planar first end 440 having a recessed first edge 424. In some embodiments, the planar first end 440 has a triangular shape and rounded corners as shown in FIG. 4. In other embodiments, the planar first end 440 is rectangular, square, circular, oval, etc. The first shell 428 includes a wall 456 attached to the planar first end 440 at the first edge 424 of the planar first end 440. The wall is dimensioned to surround a portion of the collectible 208. For example, the wall 456 can have a rectangular cuboid shape (e.g., similar to the case 200 illustrated and described in more detail with reference to FIG. 2), a cubed shape, a spherical shape, a cylindrical shape, or a triangular shape (as shown in FIG. 4). The first shell 428 can be made of acrylic, plastic, acrylonitrile butadiene styrene (ABS), metal, wood, glass, Pyrex, etc., as described in more detail with reference to FIG. 2.

The shoe tree 212 causes the collectible 204 to apply pressure or press against the stabilizer 408 and reduce movement of the collectible 204 once the collectible 204 is placed in the case. The shoe tree 212 is attached to the channels 420 shown in FIG. 4. The shoe tree 212 includes a foot-shaped portion 460 dimensioned to be inserted into the collectible 204. The foot-shaped portion 460 is configured to position or support the collectible 204. The foot-shaped portion 460 is made of foam, rubber, wood, plastic, etc. The shoe tree 212 includes an end portion 416 attached to the foot-shaped portion 460. The end portion 416 is configured to rest against the wall 456, such that the first shell 428 supports the shoe tree 212. The end portion 416 is made of metal, rubber, wood, plastic, etc.

The stabilizer 408 reduces movement of the collectible 204 within the case and also reduces sole-to-sole contact if the collectible 204 is a shoe (as shown in FIG. 4). For example, once the case is sealed, the stabilizer 408 helps the collectible 204 retain its placement for aesthetics and grade preservation. The stabilizer 408 is attached to the channels 420. The stabilizer 408 is made of metal, rubber, wood, plastic, etc. In some embodiments, the stabilizer 408 rests against the wall 456, such that the first shell 428 supports the stabilizer 408. The stabilizer 408 holds the collectible 204 against a counterpart collectible (e.g., the other shoe of the pair) encapsulated by the case.

In some embodiments, the stabilizer 408 is configured to hold the collectible 204, such that the collectible 204 is prevented from touching the first shell 428 and the second shell 432. For example, where the collectible 204 is a pair of shoes, the stabilizer 408 presses against the wall 456 to push each shoe away from the surface of the wall (first shell 428) and towards the center of the case where the shoes do not contact the first shell 428 or the second shell 432. Further, the stabilizer 408 is inserted between the shoes, such that it pushes the shoes apart and prevents sole-to-sole contact, thus protecting the shoes from wear and preserving their grade. In some embodiments, the stabilizer 408 is a compound element including a first component and a second component separated by a spring. The first component of the stabilizer 408 presses against the wall 456 to push each shoe away from the surface of the wall 456. The second component of the stabilizer 408 is inserted between the shoes to press the sole of the shoe apart. The spring pushes the two components apart, such that the shoes are prevented from touching the first shell 428 and the second shell 432.

The second shell 432 is configured to seal the case. The second shell 432 can be made of acrylic, plastic, acrylonitrile butadiene styrene (ABS), metal, wood, glass, Pyrex, etc., as described in more detail with reference to FIG. 2. In some embodiments, the case is made of a transparent material, such that the collectible 204 can be put on display. For example, the first shell 428 or the second shell 432 is transparent, such that the collectible 204 can be viewed from outside the case. In such cases, the case can be made of plastic, glass, Pyrex, etc.

The second shell 432 includes a planar second end 464 dimensioned to be placed on a lip 452 of the wall 456, such that the collectible 204 is encapsulated by the case. The planar second end 464 has a recessed second edge 436 dimensioned to align with the recessed first edge 424, such that the case is configured to be stacked on a counterpart or similar case. The planar second end 464 is rectangular, triangular, square, circular, etc., to match the wall 456 and lip 452. In some embodiments, the planar second end 464 has a triangular shape and rounded corners as shown in FIG. 4.

In some embodiments, the first shell 428 includes one or more channels 420 attached to a surface of the wall 456. For example, the channels 420 are attached to an inner surface of the wall 456 as shown in FIG. 4. In some embodiments, the channels 420 are spaced apart from each other, such that the end portion 416 of the shoe tree can be inserted into place between a pair of the channels 420. The channels 420 hold the end portion 416 in place and allow the shoe tree to remain in a fixed position inside the case to support the collectible 204. In some embodiments, the end portion 416 of the shoe tree can slide into place at the one or more channels 420 for the first shell to support the shoe tree. In other embodiments, the first shell 428 includes a first pair of channels attached to a surface of the wall 456. The first pair of channels are spaced apart, such that the shoe tree can slide into place between the first pair of channels for the first shell 428 to support the shoe tree.

In some embodiments, the stabilizer 408 can slide into place at one or more channels 420 for the first shell 428 to support the stabilizer 408. The channels 420 enable the mid-stabilizer to remain in a fixed position inside the case. In other embodiments, a second pair of channels is attached to the surface of the wall 456. The second pair of channels is spaced apart, such that the stabilizer 408 can slide into place between the second pair of channels for the first shell 428 to support the stabilizer 408.

In some embodiments, the case further includes a protective cover 448 configured to encase a portion of the first shell 428 and/or a portion of the second shell 436 to prevent damage to the case. The protective cover 448 is used to envelope the case when the case is sealed. For example, as shown in FIG. 4 when the case is triangular in shape with rounded corners, the case 448 can be used to cover the edges 424, 436 of the case. The protective cover 448 allows the collectible 204 to be viewed through openings in the protective cover 448. In some embodiments, the protective cover 448 has a triangular shape and rounded corners as shown in FIG. 4. The protective cover 448 includes a logo 444 that is laser cut into the protective cover 448. The cut-out logo 444 can also be a molded shape if the protective cover 448 is molded.

Figure 5A:
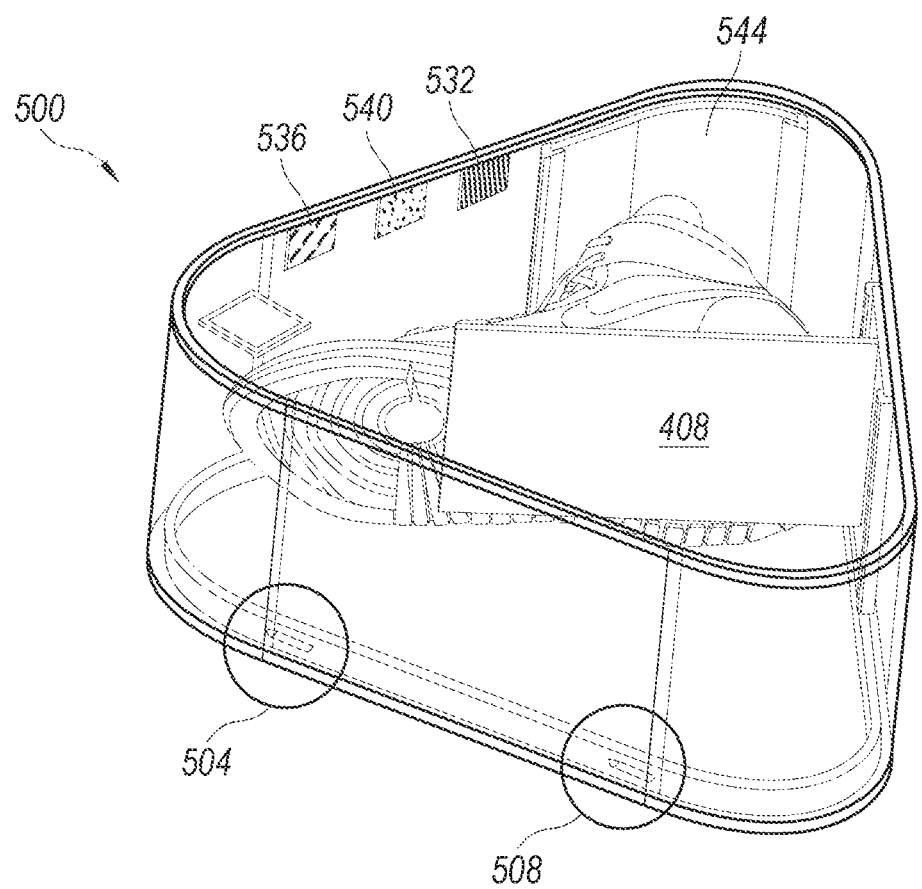
FIG. 5A illustrates a perspective view of a case for encapsulating collectibles, in accordance with one or more embodiments.

FIG. 5A illustrates a perspective view of a case 500 for encapsulating collectibles, in accordance with one or more embodiments. An example collectible 204 is illustrated and described in more detail with reference to FIG. 2.

In some embodiments, the case 500 includes one or more security tabs 504, 508 attached to a first shell or a second shell of the case 500. The first shell is the same as or similar to the first shell 428 illustrated and described in more detail with reference to FIG. 4. The second shell is the same as or similar to the second shell 436 illustrated and described in more detail with reference to FIG. 4. The one or more security tabs 504, 508 are proximate to a planar second end of the second shell. The planar second end is the same as or similar to the planar second end 432 illustrated and described in more detail with reference to FIG. 4. Each security tab 504, 508 includes a tamper seal configured to snap responsive to detecting an attempt to open the case 500. For example, when the second shell is used to seal the case 500, the security tabs 504, 508 snap shut. If a person attempts to remove the second shell to unseal and open the case 500, the security tabs 504, 508 break open to indicate the case 500 has been opened or tampered with. Thus, the security tabs 504, 508 indicate whether the collectible needs to be regraded.

In some embodiments, the case 500 is configured to be substantially airtight when the case 500 is sealed by the second shell. For example, the case 500 can be completely airtight (hermetically sealed to prevent any passage of air or other gases), vacuum sealed, sealed using a valve, or lightly sealed allowing a small airgap. For example, the airgap can permit 1%, 2%, 5%, or 10% of the air within the case 500 to escape into the environment per hour. In some embodiments, the case 500 is filled with an inert gas selected to reduce degradation of the collectible. For example, the non-reactive properties of the inert gas is used to prevent undesirable chemical reactions from taking place within the case 500, prevent bacteria from growing within the case 500, prevent chemical oxidation, minimize fire hazards, and avoid degradation of the collectible. The insert gas used can be humidified argon, helium, neon, krypton, xenon, etc.

In some embodiments, the case 500 includes a filter 532 embedded in the first shell or the second shell. The filter 532 is configured to remove moisture from the case 500 to preserve the grade of the collectible. The filter 532 can include a desiccant (e.g., a hygroscopic substance to induce or sustain a state of dryness, or absorb water). The filter 532 can be a mini pneumatic filter, a membrane filter, or a mini compressed air filter. In some embodiments, the case 500 includes a sensor 536 embedded in the first shell or the second shell. The sensor 536 is configured to monitor humidity within the case 500. The sensor 536 signals an alarm responsive to the humidity exceeding a threshold humidity. For example, the sensor 536 can be a hygrometer to measure the amount of water vapor in the air within the case 500 based on measurement of temperature, pressure, or a mechanical or electrical change as moisture is absorbed. The alarm signaled can be an audible alarm, a visual indicator of the moisture, or a message transmitted by the sensor 536 to a computer device, such as the display device 122 illustrated and described in more detail with reference to FIG. 1.

In some embodiments, a surface 544 of the first shell or the second shell is treated to inhibit corrosion of the collectible and/or prevent formation mold and mildew within the case 500. The surface 544 can be an inner surface of the case 500 as shown in FIG. 5A. For example, a protective paint or a powder coating can be applied to the surface 544 to prevent corrosion of the collectible. In embodiments, the surface 544 can be treated with silica gel, activated alumina, or anhydrous calcium sulfate to inhibit the formation of mold or mildew.

In some embodiments, the case includes a device 540 that digitally stores data specifying the grade of the collectible or a unique identity of the collectible. For example, the device 540 is at least one of a near-field communication (NFC) device, a Bluetooth Low Energy (BLE) device, or a radio-frequency identification (RFID) tag embedded in the first shell or the second shell. The NFC device, BLE device, or RFID tag store data specifying the grade of the collectible or a unique identity of the collectible that can be scanned, e.g., using the scanning device 114 of the system 100 illustrated and described in more detail with reference to FIG. 1. NFC devices, BLE devices, and RFID tags are described in more detail with reference to FIG. 1.

Figure 5B:
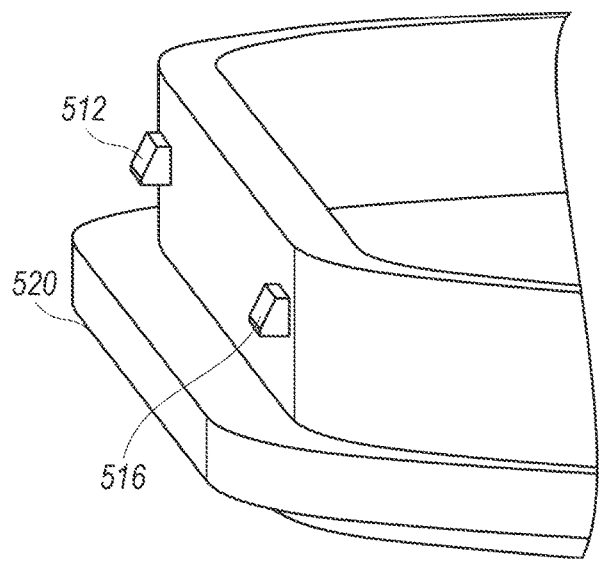
FIG. 5B illustrates a perspective view of a portion of a case for encapsulating collectibles, in accordance with one or more embodiments.

FIG. 5B illustrates a perspective view of a portion of a case 520 for encapsulating collectibles, in accordance with one or more embodiments. An example collectible is the same as or similar to the collectible 204 illustrated and described in more detail with reference to FIG. 2.

In some embodiments, the case 520 includes one or more security tabs 512, 516 attached to a first shell or a second shell of the case 520. The first shell is the same as or similar to the first shell 428 illustrated and described in more detail with reference to FIG. 4. The second shell is the same as or similar to the second shell 436 illustrated and described in more detail with reference to FIG. 4. The one or more security tabs 512, 516 are proximate to a planar second end of the second shell. The planar second end is the same as or similar to the planar second end 432 illustrated and described in more detail with reference to FIG. 4. Each security tab 512, 516 includes a tamper seal configured to snap responsive to detecting an attempt to open the case.

Figure 5C:
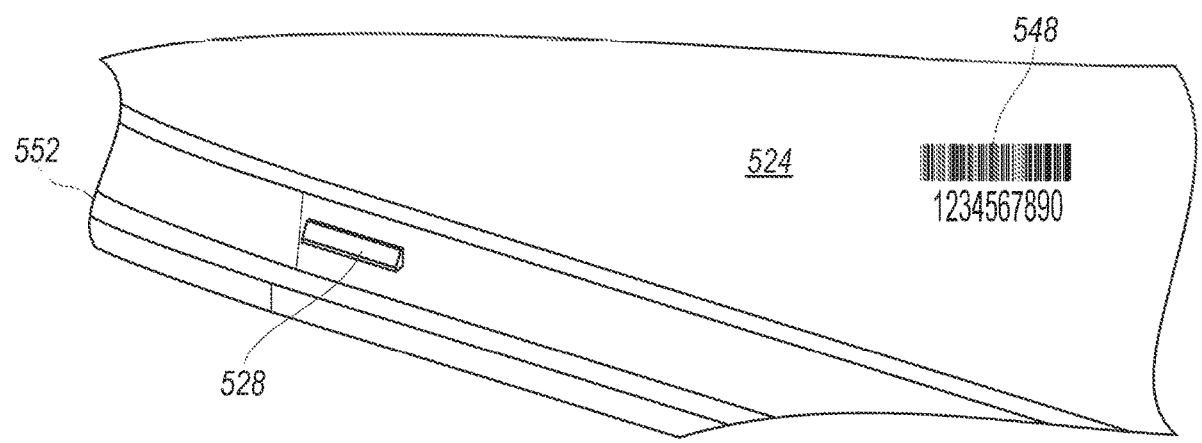
FIG. 5C illustrates a perspective view of a portion of a case for encapsulating collectibles, in accordance with one or more embodiments.

FIG. 5C illustrates a perspective view of a portion of a case 524 for encapsulating collectibles, in accordance with one or more embodiments. An example collectible is the same as or similar to the collectible 204 illustrated and described in more detail with reference to FIG. 2.

In some embodiments, the case 524 includes a security tab 528 attached to a first shell or a second shell of the case 524. The first shell is the same as or similar to the first shell 428 illustrated and described in more detail with reference to FIG. 4. The second shell is the same as or similar to the second shell 436 illustrated and described in more detail with reference to FIG. 4. The security tab 528 is proximate to a planar second end of the second shell. The planar second end is the same as or similar to the planar second end 432 illustrated and described in more detail with reference to FIG. 4. The security tab 528 includes a tamper seal configured to snap responsive to detecting an attempt to open the case.

In some embodiments, the case includes a quick response (QR™) code 548 or a label imprinted on the first shell or the second shell. The QR™ code 548 or the label specifies a grade of the collectible or a unique identity of the collectible. The QR™ code 548 or the label is readable by a scanning device. The scanning device is the same as or similar to the scanning device 114 illustrated and described in more detail with reference to FIG. 1. Each collectible is graded and authenticated using the system illustrated and described in more detail with reference to FIG. 1, and is assigned its own unique identity. QR™ code 548 or label is configured to be scanned to provide at least one of the grading notes of the collectible, an image of the collectible, provenance information of the collectible, manufacturer information of the collectible, or a link to an online marketplace for the collectible.

In some embodiments, the case includes a moisture barrier 552 embedded in the first shell or the second shell. The moisture barrier 552 is configured to prevent moisture from entering the case 524. The moisture barrier 552 or vapor barrier includes material used for damp proofing that resists diffusion of moisture through the first shell and the second shell to prevent interstitial condensation. The moisture barrier 552 can also function as a vapor retarder having varying degrees of permeability.

Figure 6:
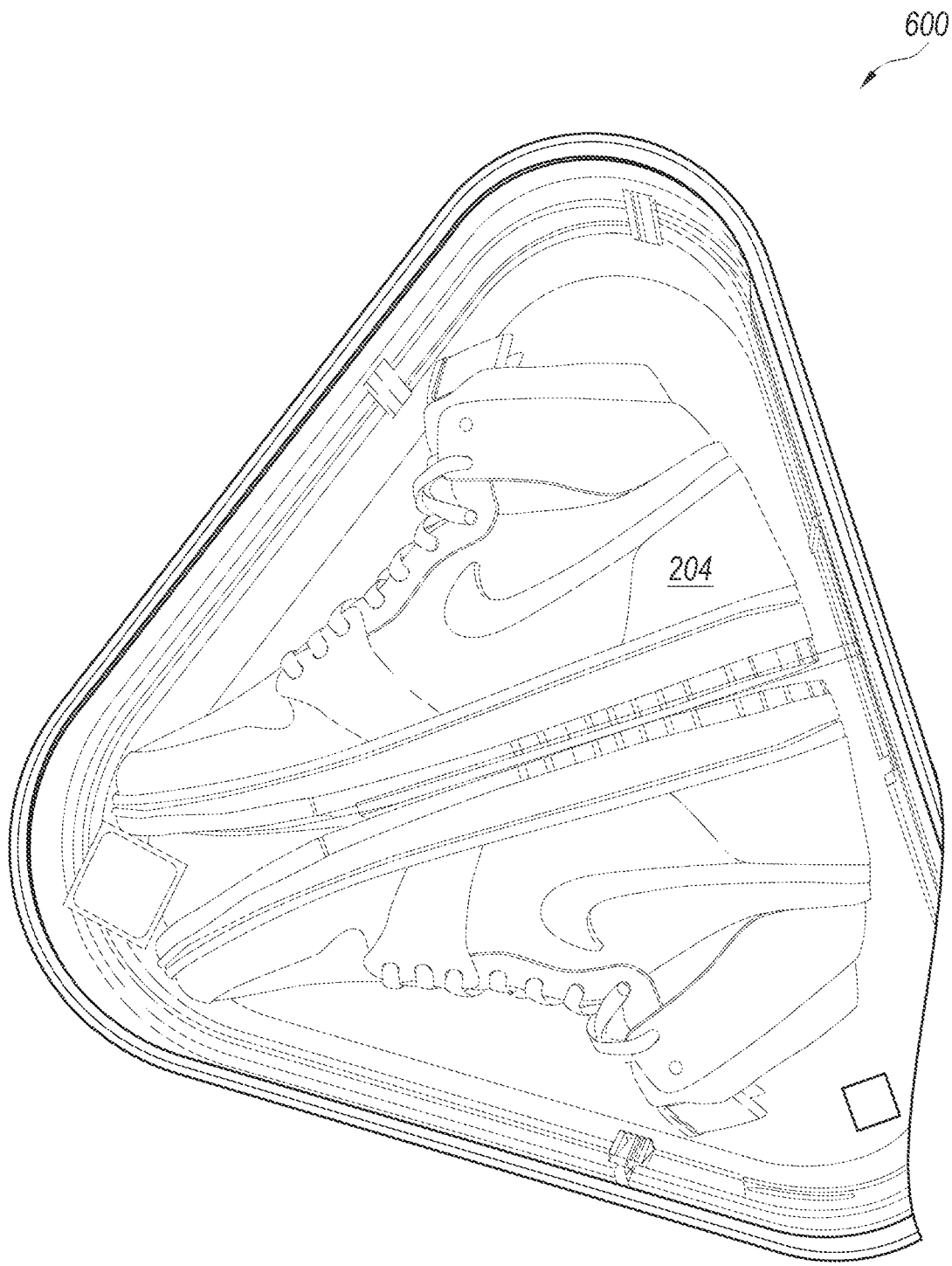
FIG. 6 illustrates a planar view of a case for encapsulating collectibles, in accordance with one or more embodiments.

FIG. 6 illustrates a planar view of a case 600 for encapsulating a collectible 204, in accordance with one or more embodiments. The collectible 204 is illustrated and described in more detail with reference to FIG. 2.

Figure 7:
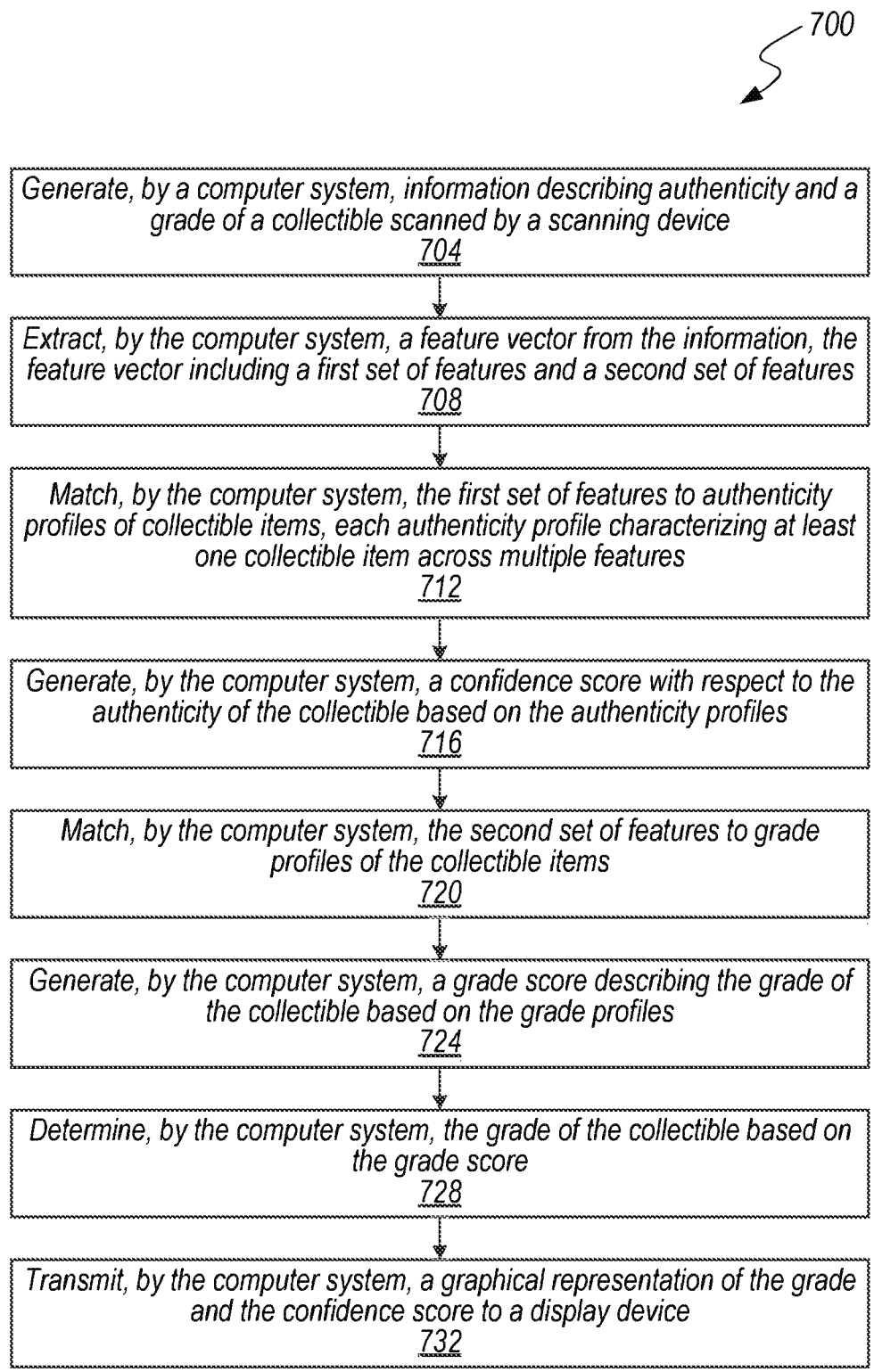
FIG. 7 is a flow diagram illustrating a process for authenticating and grading collectibles, in accordance with one or more embodiments.
Figure 8:
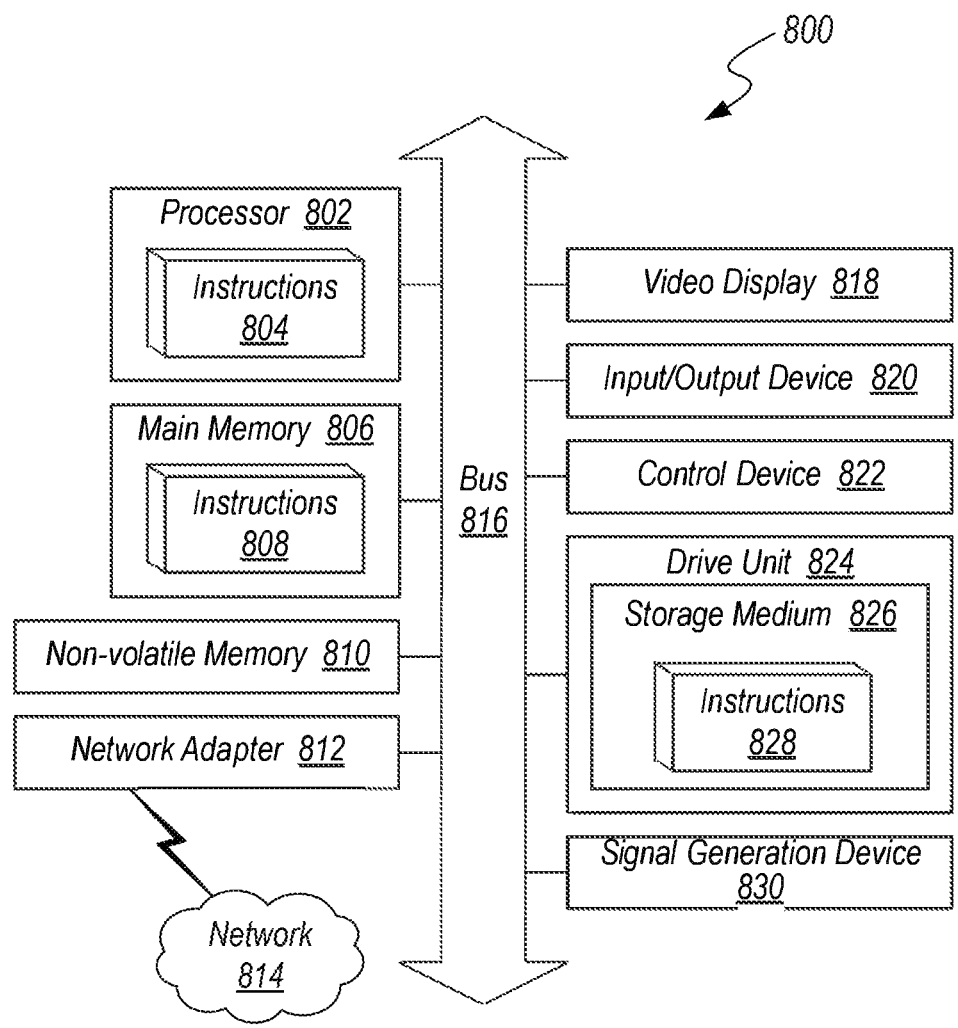
FIG. 8 is a block diagram illustrating an example computer system, in accordance with one or more embodiments.

FIG. 7 is a flow diagram illustrating a process 700 for authenticating and grading collectibles, in accordance with one or more embodiments. In some embodiments, the process 700 is performed using the system 100 illustrated and described in more detail with reference to FIG. 1. In other embodiments, components of the computer system 800 illustrated and described in more detail with reference to FIG. 8 are used. Likewise, other embodiments include different and/or additional steps, or are performed in a different order.

The system 100 generates (704) information describing authenticity and a grade of a collectible scanned by a scanning device. The collectible is the same as or similar to the collectible 112 illustrated and described in more detail with reference to FIG. 1. The scanning device is the same as or similar to the scanning device 114 illustrated and described in more detail with reference to FIG. 1. From the scanning device, the system 100 receives information about the collectible, such as items features, dimensions of the item, colors, textures, and spectral and other non-destructively obtained information regarding the materials from which the collectible is made. The system 100 receives the scanned information and processes such imaged information to categorize such information.

The system 100 extracts (708) a feature vector from the information. The feature vector includes a first set of features and a second set of features. The feature vector is a collection of individually measurable properties or characteristics (e.g., corners, edges, etc.) of the collectible. The feature vector includes a first set of features (e.g., describing a shape, a color of at least one panel, a logo, a tread pattern, a coloration, spectral features, a size, a brand, a make, or a model of the collectible) and a second set of features (e.g., describing inconsistent colors in panels, stitching errors, excessive glue in assembly, creases in leather, fading of colors, consistency of colors across material, surface texture, stitching quality, finish, or lace quality of the collectible).

The system 100 matches (712) the first set of features to stored authenticity profiles of collectible items. The authenticity profiles are the same as or similar to the authenticity profiles 120 illustrated and described in more detail with reference to FIG. 1. For example, the authenticity profiles 120 can be stored in a database that may or may not be part of the system 100. The database is the same as or similar to the database 119 illustrated and described in more detail with reference to FIG. 1. The system 100 communicates with the database over the computer network. Each authenticity profile of the stored authenticity profiles characterizes at least one collectible item (e.g., a basketball shoe) of the collectible items across multiple features, e.g., brand, color, etc.

The system 100 generates (716) a confidence score with respect to the authenticity of the collectible based on the authenticity profiles. For example, the system 100 determines from the first set of features how well the pieces of the collectible fit together, whether there is evidence of excess glue on the collectible, or whether an image of the collectible reveals that elements of the collectible are separating, etc. The confidence score reflects a quality of the match between the first set of features and the stored authenticity profiles. The confidence score can be a number from 0 to 10 (e.g., 4.775) or a percentage number from 0 to 100 (e.g., 76.485%). A higher confidence score denotes that the collectible has a greater likelihood of being authentic.

The system 100 matches (720) the second set of features to grade profiles of the collectible items. The grade profiles are the same as or similar to the grade profiles 124 illustrated and described in more detail with reference to FIG. 1. The grade profiles include stored information denoting the quality and color of the collectible items. The grade profiles are stored in a database. Example grade profiles for the collectible items include data reflecting which features are associated with different grading tiers in ascending or descending order of preservation. Matching the second set of features includes color matching to a baseline expectation for the collectible.

The system 100 generates (724) a grade score describing the grade of the collectible based on the grade profiles. The grade score is numeric or alphanumeric. In some embodiments, the grade profiles specify a range of points arranged in increments, e.g., 000, 100, 200, . . . 999. The grade score is associated with a designation and a particular number of points (e.g., 568) within the range of points.

The system 100 determines (728) the grade of the collectible based on the grade score. An exemplary method for shoe grading implements a 1000-point grading system with ten-point increments. Different designations are applied depending on the shoe's authenticity and use, for example:

NW—never worn
SW—slightly worn
WW—well worn

A collectible shoe can have any one of these designations along with a number of points, e.g., NW/560, NW/800, SW/340, etc.

The system 100 transmits (732) a graphical representation of the grade and the confidence score to a display device. The display device is the same as or similar to the display device 122 illustrated and described in more detail with reference to FIG. 1.

FIG. 8 is a block diagram illustrating an example computer system 800, in accordance with one or more embodiments. Components of the example computer system 800 can be used to implement the system 100 and digital storage device 540 illustrated and described in more detail with reference to FIGS. 1 and 5A. At least some operations described herein can be implemented on the computer system 800.

The computer system 800 can include one or more central processing units ("processors") 802, main memory 806, non-volatile memory 810, network adapter 812 (e.g., network interface), video display 818, input/output devices 820, control device 822 (e.g., keyboard and pointing devices), drive unit 824 including a storage medium 826, and a signal generation device 830 that are communicatively connected to a bus 816. The bus 816 is illustrated as an abstraction that represents one or more physical buses and/or point-to-point connections that are connected by appropriate bridges, adapters, or controllers. The bus 816, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The computer system 800 can share a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the computer system 800.

While the main memory 806, non-volatile memory 810, and storage medium 826 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 828. The term "machine-readable medium" and "storage medium" shall also be taken to include any medium that is capable of storing, encoding, or carrying a set of instructions for execution by the computer system 800.

In general, the routines executed to implement the embodiments of the disclosure may be implemented as part of an operating system or a specific application, component, program, object, module, or sequence of instructions (collectively referred to as "computer programs"). The computer programs typically include one or more instructions (e.g., instructions 804, 808, 828) set at various times in various memory and storage devices in a computing device. When read and executed by the one or more processors 802, the instruction(s) cause the computer system 800 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 810, floppy and other removable disks, hard disk drives, optical disks (e.g., Compact Disk Read-Only Memory (CD-ROMS), Digital Versatile Disks (DVDs)), and transmission-type media such as digital and analog communication links.

The network adapter 812 enables the computer system 800 to mediate data in a network 814 with an entity that is external to the computer system 800 through any communication protocol supported by the computer system 800 and the external entity. The network adapter 812 can include a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 812 may include a firewall that governs and/or manages permission to access/proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

Figure 9A:
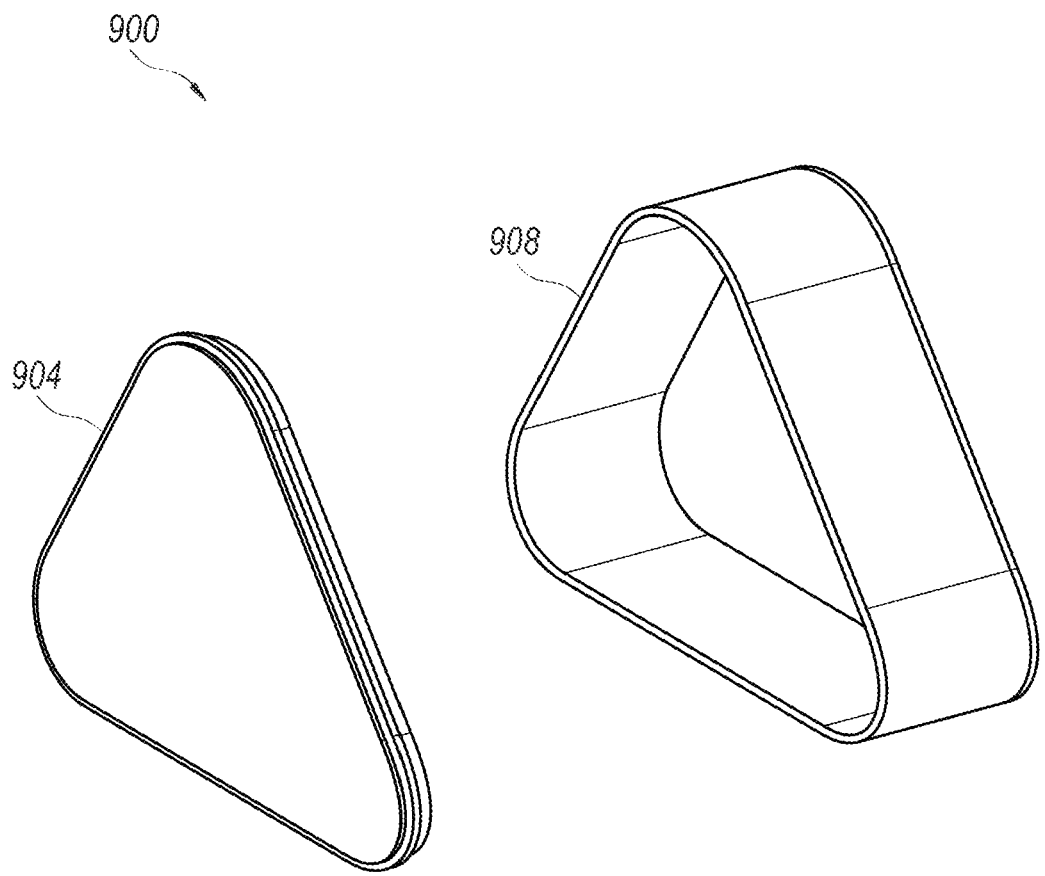
FIG. 9A illustrates a perspective view of a case for encapsulating collectibles, in accordance with one or more embodiments.

FIG. 9A illustrates a perspective view of a case 900 for encapsulating collectibles, in accordance with one or more embodiments. The case 900 includes a shell 904 and a shell 908.

FIG. 9B illustrates a perspective view of a case for encapsulating collectibles, in accordance with one or more embodiments. The case includes a shell 904, a shell 908, and a protective cover 912.

Figure 10:
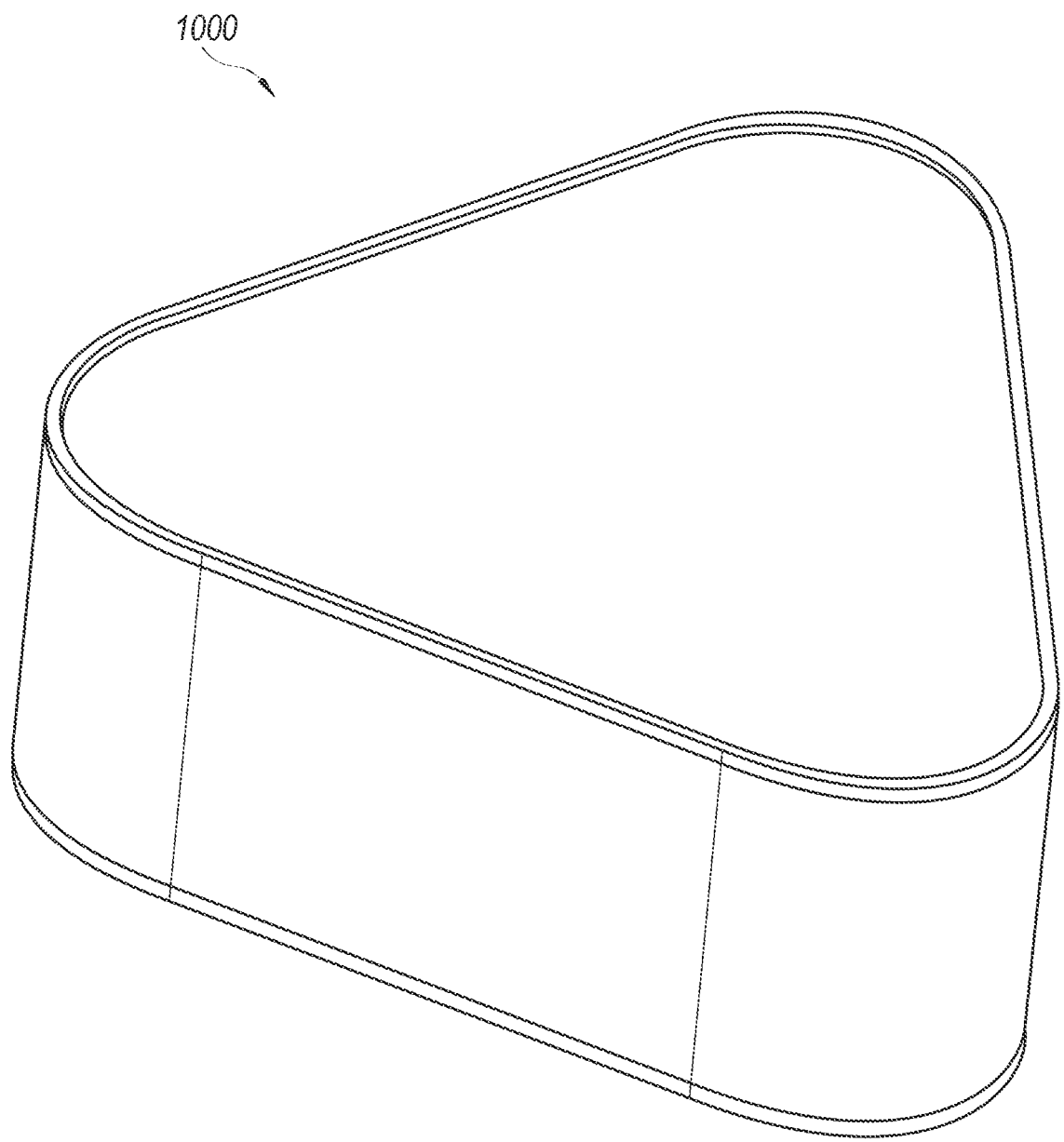
FIG. 10 illustrates a perspective view of a case for encapsulating collectibles, in accordance with one or more embodiments.

FIG. 10 illustrates a perspective view of a case 1000 for encapsulating collectibles, in accordance with one or more embodiments.

Figure 11:
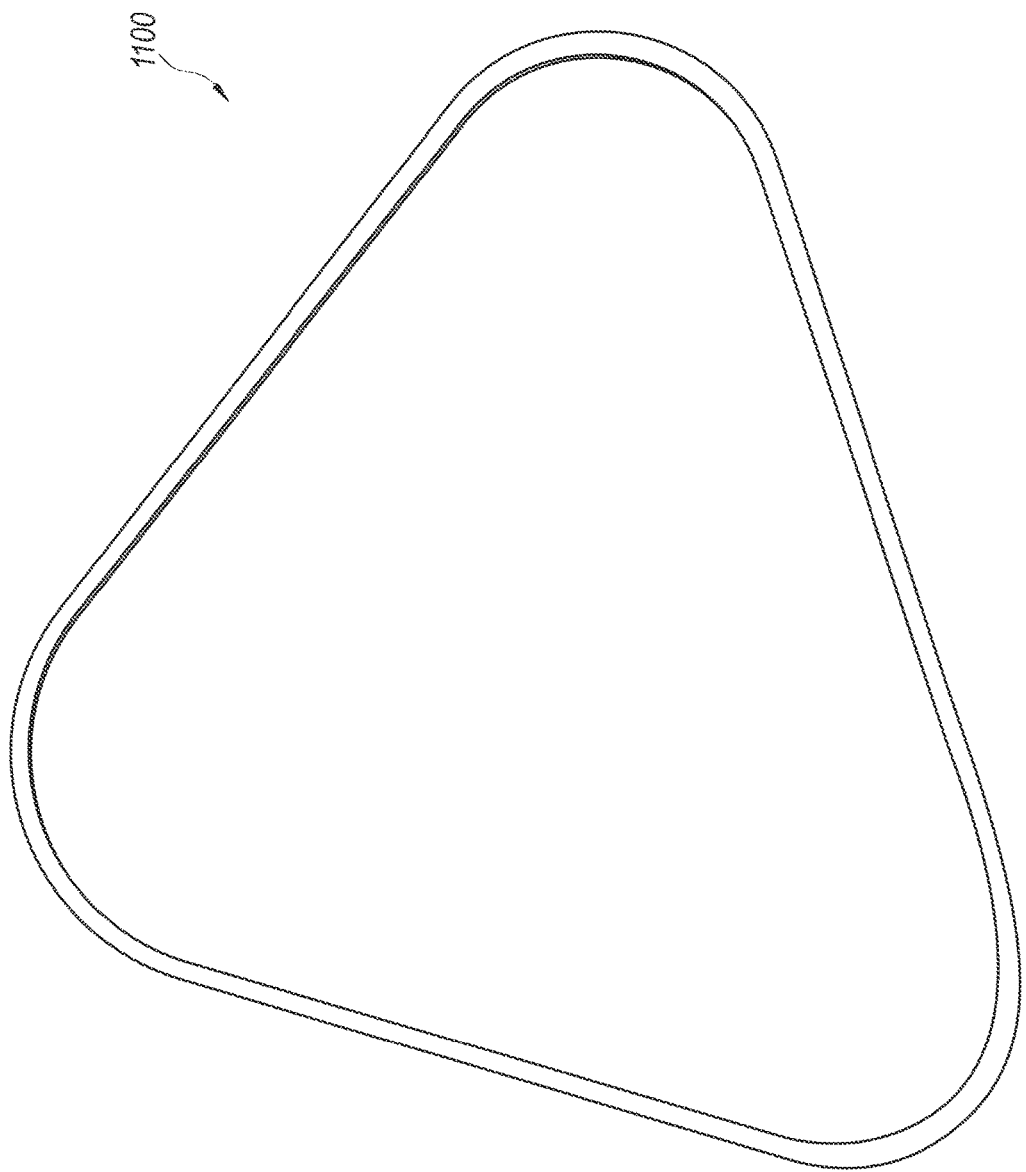
FIG. 11 illustrates a top view of a case for encapsulating collectibles, in accordance with one or more embodiments.

FIG. 11 illustrates a top view of a case 1100 for encapsulating collectibles, in accordance with one or more embodiments.

Figure 12:
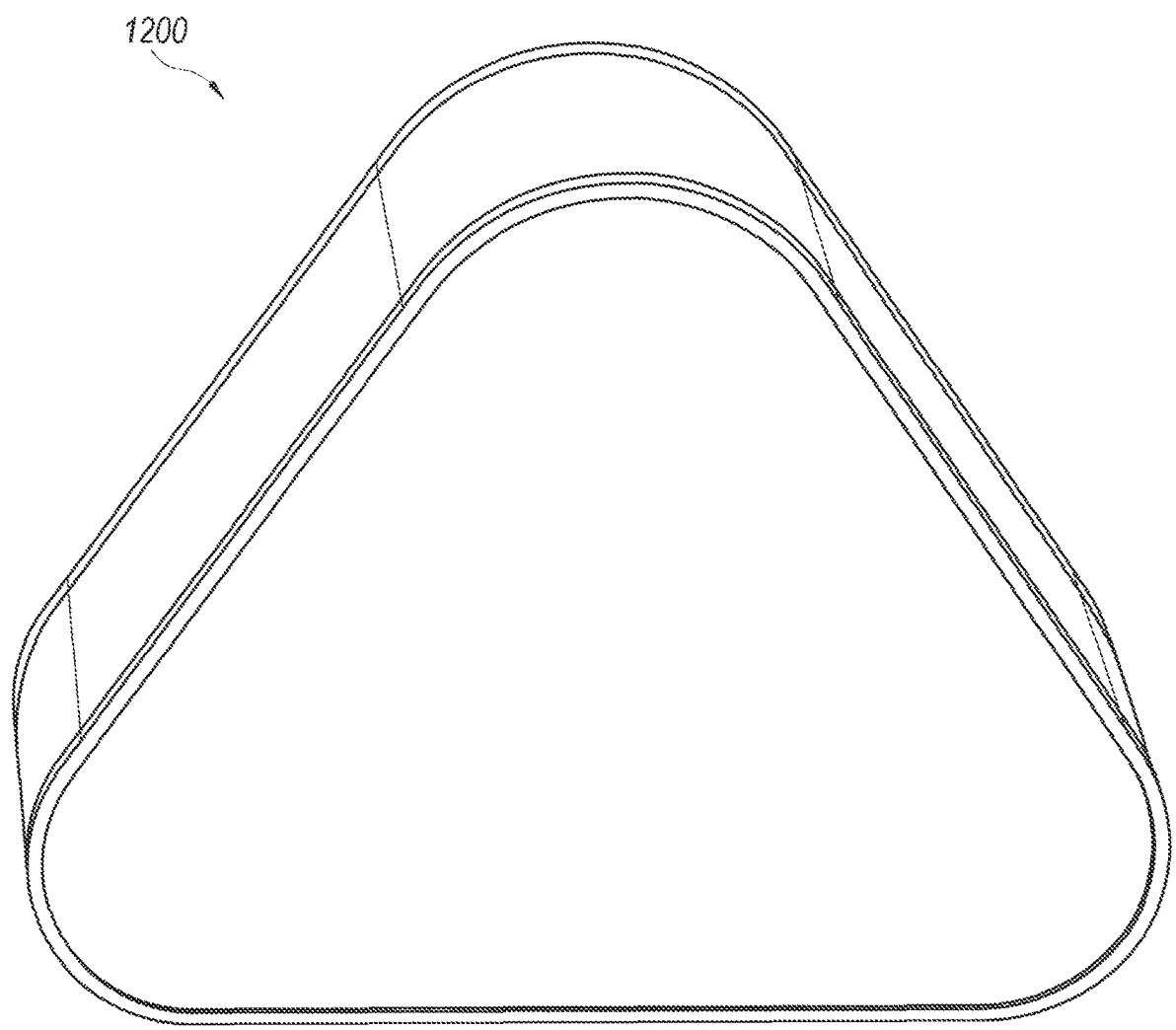
FIG. 12 illustrates a perspective view of a case for encapsulating collectibles, in accordance with one or more embodiments.

FIG. 12 illustrates a perspective view of a case 1200 for encapsulating collectibles, in accordance with one or more embodiments.

Figure 13:
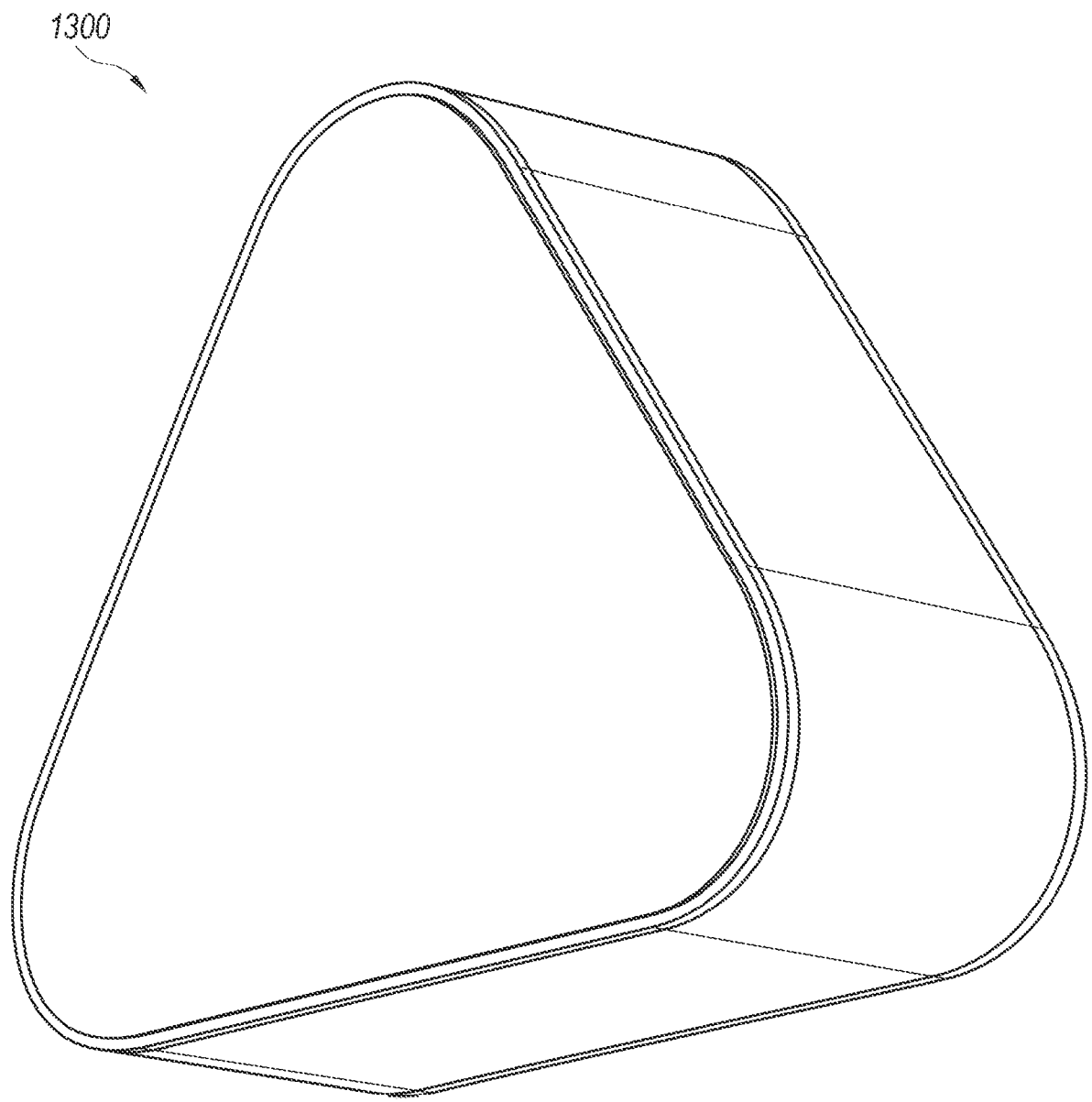
FIG. 13 illustrates a perspective view of a case for encapsulating collectibles, in accordance with one or more embodiments.

FIG. 13 illustrates a perspective view of a case 1300 for encapsulating collectibles, in accordance with one or more embodiments.

Figure 14:
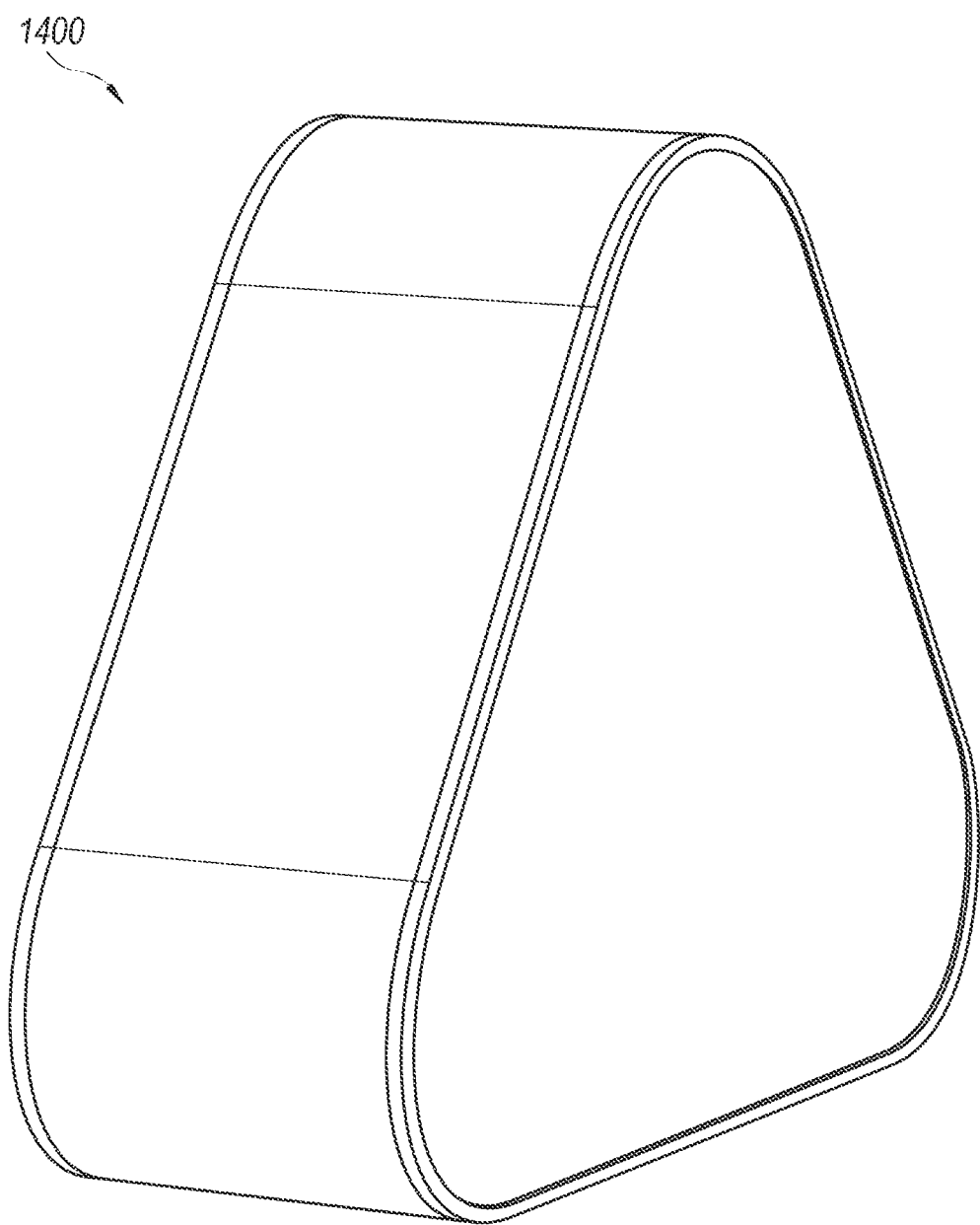
FIG. 14 illustrates a perspective view of a case for encapsulating collectibles, in accordance with one or more embodiments.

FIG. 14 illustrates a perspective view 1400 of a case for encapsulating collectibles, in accordance with one or more embodiments.

Figure 15:
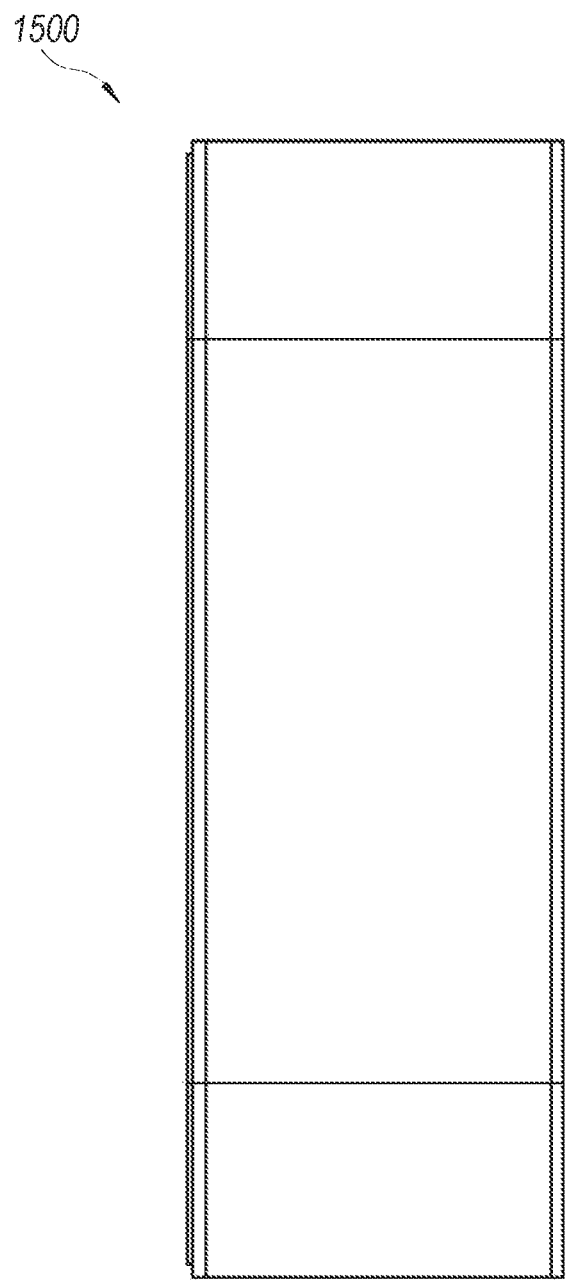
FIG. 15 illustrates a side view of a case for encapsulating collectibles, in accordance with one or more embodiments.

FIG. 15 illustrates a side view of a case 1500 for encapsulating collectibles, in accordance with one or more embodiments.

In some additional embodiments, a computer system generates a feature vector describing authenticity and a grade of a collectible scanned by a scanning device. The feature vector includes a first set of features and a second set of features. The computer system matches the first set of features to authenticity profiles of collectible items. Each authenticity profile characterizes at least one collectible item across multiple features. The computer system generates a confidence score with respect to the authenticity of the collectible based on the authenticity profiles. The computer system matches the second set of features to grade profiles of the collectible items. The computer system generates a grade score describing the grade of the collectible based on the grade profiles. The computer system determines the grade of the collectible based on the grade score. The computer system transmits a graphical representation of the grade and the confidence score to a display device.

In some embodiments, the computer system receives provenance information of the collectible from a database. The confidence score is further based on the provenance information.

In some embodiments, the computer system receives the grade score from labeled training data provided by an expert.

In some embodiments, a case includes a first shell dimensioned to encapsulate a portion of a collectible. The first shell includes a planar first end. A wall is attached to the planar first end at an edge of the planar first end. The wall is dimensioned to surround the portion of the collectible. A second shell is configured to seal the case. The second shell includes a planar second end dimensioned to be placed on the wall, such that the collectible is encapsulated by the case.

In some embodiments, the case includes at least one of a near-field communication (NFC) device, a Bluetooth Low Energy (BLE) device, or a radio-frequency identification (RFID) tag embedded in the first shell or the second shell. The at least one of the NFC device, the BLE device, or the RFID tag store data specify the grade of the collectible or a unique identity of the collectible.

In some embodiments, the case further includes a label imprinted on the first shell or the second shell. The label is configured to be scanned by a computer device to provide at least one of the grading notes of the collectible, an image of the collectible, provenance information of the collectible, manufacturer information of the collectible, or a link to an online marketplace for the collectible.

In some embodiments, the case further includes a protective cover configured to encase a portion of the first shell to prevent damage to the case, and allow the collectible to be viewed through an opening in the protective cover.

In some embodiments, the protective cover has a triangular shape and rounded corners.

In some embodiments, each of the planar first end and the planar second end has a triangular shape and rounded corners.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

The description and drawings herein are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only and is not intended to further limit the scope and meaning of the disclosure or of any exemplified term. Likewise, the disclosure is not limited to various embodiments given in this specification.

It is to be understood that the embodiments and variations shown and described herein are merely illustrative of the principles of this invention and that various modifications may be implemented by those skilled in the art.

I claim:

1. A case comprising:
   a first shell dimensioned to encapsulate a portion of a collectible, the first shell comprising:
      a planar first end;
      a wall attached to the planar first end;
      a first pair of channels attached to a surface of the wall; and
      a second pair of channels attached to the surface of the wall wherein the second pair of channels is distinct from the first pair of channels;
   a shoe tree comprising an end portion attached to a foot-shaped portion and configured to slide into place between the first pair of channels, wherein the first shell is configured to support the shoe tree; and
   a stabilizer, wherein the stabilizer is distinct from the end portion, configured to:
      slide into place between the second pair of channels, wherein the first shell is configured to support the stabilizer; and
      hold the collectible against a counterpart collectible encapsulated by the case.

2. The case of claim 1, further comprising:
   a second shell configured to seal the case, wherein the second shell comprises a planar second end dimensioned to be placed on a lip of the wall, wherein the case is configured to encapsulate the collectible, the planar second end having a recessed second edge dimensioned to align with a recessed first edge of the planar first end, wherein the case is configured to be stacked on a counterpart case, and
   one or more security tabs attached to the first shell or the second shell, the one or more security tabs proximate to the planar second end, the one or more security tabs comprising a tamper seal configured to snap responsive to detecting an attempt to open the case.

3. The case of claim 2, wherein the first shell or the second shell is transparent to allow viewing of the collectible from outside of the case.

4. The case of claim 2, wherein the case is substantially airtight when the case is sealed by the second shell, and wherein the case is filled with an inert gas, wherein said inert gas is selected to reduce degradation of the collectible.

5. The case of claim 2, wherein the stabilizer is configured to hold the collectible to prevent the collectible from touching the first shell and the second shell.

6. The case of claim 2, wherein the first shell comprises one or more channels attached to a surface of the wall, the one or more channels spaced apart, wherein
   the end portion of the shoe tree is configured to slide into place at the one or more channels for the first shell to support the shoe tree, and wherein
   the stabilizer is configured to slide into place at the one or more channels for the first shell to support the stabilizer.

7. The case of claim 2, comprising:
a filter embedded in the first shell or the second shell, the filter configured to remove moisture from the case; and
a sensor embedded in the first shell or the second shell, the sensor configured to:
monitor humidity within the case; and
   signal an alarm responsive to the humidity exceeding a threshold humidity.

8. The case of claim 2, comprising:
a moisture barrier embedded in the first shell or the second shell, the moisture barrier configured to prevent moisture from entering the case.

9. The case of claim 2, wherein the first shell or the second shell is treated to:
inhibit corrosion of the collectible; and
prevent formation mold and mildew within the case.

10. The case of claim 2, comprising a barcode or a label imprinted on the first shell or the second shell,
   wherein the barcode or the label specifies a grade of the collectible or a unique identity of the collectible, and
   wherein the barcode or the label are readable by a scanning device.

11. A case comprising:
a first shell dimensioned to encapsulate a portion of a collectible, the first shell comprising:
   a planar first end, wherein the planar first end has a triangular shape and rounded corners; and
   a wall dimensioned to surround the portion of the collectible;
a shoe tree comprising:
   an end portion attached to a foot-shaped portion, wherein the first shell is configured to support the shoe tree;
a stabilizer configured to hold the collectible against a counterpart collectible encapsulated by the case, wherein the stabilizer is distinct from the end portion; and
a second shell configured to seal the case.

12. The case of claim 11, wherein the stabilizer is configured to hold the collectible against a counterpart collectible encapsulated by the case.

13. The case of claim 11, wherein the second shell further comprises a planar second end dimensioned to be placed on the wall, wherein the case is configured to encapsulate the collectible.

14. The case of claim 13, comprising:
one or more security tabs attached to the first shell or the second shell, the one or more security tabs proximate to the planar second end, the one or more security tabs comprising a tamper seal configured to snap responsive to detecting an attempt to open the case.

15. The case of claim 11, wherein the first shell or the second shell is transparent to allow viewing of the collectible from outside of the case.

16. The case of claim 11, wherein the first shell comprises:
one or more channels attached to a surface of the wall, wherein the end portion of the shoe tree is configured to slide into place at the one or more channels for the first shell to support the shoe tree, and wherein the stabilizer is configured to slide into place at the one or more channels for the first shell to support the stabilizer.

17. The case of claim 11, wherein the case is substantially airtight when the case is sealed by the second shell, and wherein the case is filled with an inert gas, wherein said inert gas is selected to reduce degradation of the collectible.

18. The case of claim 11, wherein the stabilizer is configured to hold the collectible to prevent the collectible from touching the first shell and the second shell.

19. The case of claim 11, comprising:
a filter embedded in the first shell or the second shell, the filter configured to remove moisture from the case; and
a sensor embedded in the first shell or the second shell, the sensor configured to:
monitor humidity within the case; and
   signal an alarm responsive to the humidity exceeding a threshold humidity.

20. The case of claim 11, comprising:
a moisture barrier embedded in the first shell or the second shell, the moisture barrier configured to prevent moisture from entering the case.

* * * * *